(12) United States Patent
Lin et al.

(10) Patent No.: US 11,870,568 B2
(45) Date of Patent: Jan. 9, 2024

(54) CHANNEL QUALITY INDICATOR FEEDBACK ENHANCEMENT METHOD, DEVICE AND SYSTEM, USER EQUIPMENT, AND BASE STATION

(71) Applicant: ZTE CORPORATION, Shenzhen (CN)

(72) Inventors: Wei Lin, Shenzhen (CN); Peng Hao, Shenzhen (CN); Jing Shi, Shenzhen (CN); Wei Guo, Shenzhen (CN); Min Ren, Shenzhen (CN); Xianghui Han, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 395 days.

(21) Appl. No.: 17/267,740

(22) PCT Filed: Aug. 12, 2019

(86) PCT No.: PCT/CN2019/100196
§ 371 (c)(1),
(2) Date: Feb. 10, 2021

(87) PCT Pub. No.: WO2020/030178
PCT Pub. Date: Feb. 13, 2020

(65) Prior Publication Data
US 2022/0360363 A1 Nov. 10, 2022

(30) Foreign Application Priority Data
Aug. 10, 2018 (CN) .......................... 201810912303.9

(51) Int. Cl.
*H04L 1/00* (2006.01)
*H04L 1/1867* (2023.01)
*H04L 1/20* (2006.01)

(52) U.S. Cl.
CPC .......... *H04L 1/0026* (2013.01); *H04L 1/0003* (2013.01); *H04L 1/0008* (2013.01); *H04L 1/1896* (2013.01); *H04L 1/203* (2013.01)

(58) Field of Classification Search
CPC ............................. H04L 1/0026; H04L 1/203
See application file for complete search history.

(56) References Cited

U.S. PATENT DOCUMENTS

| | | | | |
|---|---|---|---|---|
| 8,693,415 B2* | 4/2014 | Dai | ....................... | H04W 72/21 |
| | | | | 370/328 |
| 2005/0068908 A1* | 3/2005 | Qian | ..................... | H04L 1/1692 |
| | | | | 370/332 |

(Continued)

FOREIGN PATENT DOCUMENTS

| | | |
|---|---|---|
| CN | 101047469 A | 10/2007 |
| CN | 101471745 A | 7/2009 |

(Continued)

OTHER PUBLICATIONS

Extended European Search Report for Application No. 19848341.4, dated Apr. 8, 2022, 7 pages.

(Continued)

*Primary Examiner* — Fahmida S Chowdhury
(74) *Attorney, Agent, or Firm* — Morgan, Lewis & Bockius LLP

(57) ABSTRACT

Provided are a CQI feedback enhancement method, a CQI feedback enhancement device, a CQI feedback enhancement system, a UE and a base station. The CQI feedback enhancement method includes: a base station sends downlink traffic data to a UE; the UE decodes the downlink traffic data; first information is sent to the base station in a case where an error result is obtained by decoding the downlink traffic data, (Continued)

where the first information includes an NACK instruction and an aperiodic CQI, or the first information includes one NACK state of multiple NACK states and different NACK states correspond to different CQIs; and the base station receives the first information.

18 Claims, 4 Drawing Sheets

(56) References Cited

U.S. PATENT DOCUMENTS

| | | | | |
|---|---|---|---|---|
| 2009/0022135 | A1* | 1/2009 | Papasakellariou | H04L 1/1671 370/344 |
| 2010/0232367 | A1* | 9/2010 | Fukui | H04L 1/0027 370/329 |
| 2011/0243012 | A1 | 10/2011 | Luo et al. | |
| 2011/0268090 | A1* | 11/2011 | Qu | H04L 5/001 370/335 |
| 2011/0305152 | A1* | 12/2011 | Ofuji | H04L 1/0026 370/252 |
| 2012/0039291 | A1* | 2/2012 | Kwon | H04W 52/325 370/329 |
| 2017/0366328 | A1* | 12/2017 | Seo | H04L 5/0051 |
| 2019/0103951 | A1* | 4/2019 | Park | H04W 72/0446 |
| 2019/0245661 | A1* | 8/2019 | Baldemair | H04L 5/0055 |
| 2019/0280806 | A1* | 9/2019 | Baldemair | H04L 1/1854 |
| 2020/0084761 | A1* | 3/2020 | Baldemair | H04L 5/0057 |

FOREIGN PATENT DOCUMENTS

| | | |
|---|---|---|
| CN | 101997666 A | 3/2011 |
| CN | 105991235 A | 10/2016 |
| EP | 1981299 A1 | 10/2008 |
| EP | 2273710 A1 | 1/2011 |
| EP | 2375838 A1 | 10/2011 |
| KR | 20090084996 A | 8/2009 |
| KR | 20180038532 A | 4/2018 |
| WO | WO-2011020396 A1 | 2/2011 |

OTHER PUBLICATIONS

Australian Office Action for Application No. 2019318672, dated Oct. 8, 2021, 3 pages.
Chinese Office Action for Application No. 201810912303.9, dated Nov. 3, 2021, 17 pages including translation.
Korean Office Action for Application No. 10-2021-7007327, dated Jul. 29, 2022, 12 pages, including translation.
International Search Report for Application No. PCT/CN2019/100196, dated Nov. 4, 2019, 4 pages including English translation.

* cited by examiner

CHANNEL QUALITY INDICATOR FEEDBACK ENHANCEMENT METHOD, DEVICE AND SYSTEM, USER EQUIPMENT, AND BASE STATION

CROSS-REFERENCES TO RELATED APPLICATIONS

This application is a U.S. National Stage Application, filed under 35 U.S.C. 371, of International Patent Application No. PCT/CN2019/100196, filed on Aug. 12, 2019, which claims priority to Chinese Patent Application No. 201810912303.9 filed with the CNIPA on Aug. 10, 2018, the disclosure of which are incorporated herein by reference in their entireties.

TECHNICAL FIELD

Embodiments of the present disclosure relate to, but are not limited to, the field of communications and, specifically, relate to, but are not limited to, channel quality indicator (CQI) feedback enhancement method, device and system, a user equipment (UE) and a base station.

BACKGROUND

The application scenarios of the 5th generation mobile communication technology (5G) include enhanced mobile broadband (eMBB), massive machine type communications (mMTC) and ultra-reliable and low latency communications (URLLC). Strict requirements on reliability and low latency of data transmission are set for the URLLC scenario.

In related art, in order to transmit downlink traffic data to a UE, a base station may determine a modulation and coding scheme (MCS) for the downlink traffic data based on a CQI and other information reported by the UE, and the base station may perform modulation and coding on the downlink traffic data according to the selected MCS. After receiving the downlink traffic data transmitted by the base station, the UE may decode the downlink traffic data according to the MCS. If the UE decodes the downlink traffic data and obtains an error result, the UE feeds back a negative acknowledgement (NACK) to the base station.

In related art, for periodic CQI reporting, a relative small period is configured for the CQI reporting. In this way, a reported CQI approximates to a CQI during traffic data transmission, but more reporting resources are consumed.

For aperiodic CQI reporting, the base station needs to send control information to trigger the UE to perform reporting. The process includes: the control information is sent to the UE, the UE receives the control information, and sends aperiodic CQI to the base station after measurement. In this way, the reported CQI approximates to a CQI during traffic data transmission, but aperiodic CQI reporting has complicated process and high latency, which may lead to retransmission timeout, and thereby, the CQI reporting fails to reach a traffic latency target.

In view of the above, there is no good solution for reliable CQI reporting having relatively small resource overheads.

SUMMARY

Embodiments of the present disclosure provides CQI feedback enhancement method, device and system, a UE and a base station, so as to solve the problem of large resource overheads and/or high latency in CQI reporting An embodiment of the present disclosure provides a CQI feedback enhancement method. The method includes the steps described below.

Downlink traffic data is decoded upon receiving the downlink traffic data sent by a base station.

First information is sent to the base station in a case where an error result is obtained by decoding the downlink traffic data. The first information includes an NACK instruction and aperiodic CQI information. Alternatively, the first information includes one NACK state of multiple NACK states, and different NACK states correspond to different CQI information.

An embodiment of the present disclosure further provides a CQI feedback enhancement device. The device includes a decoding module and a first sending module.

The decoding module is configured to decode downlink traffic data upon receiving the downlink traffic data sent by a base station.

The first sending module is configured to send first information to the base station in a case where an error result is obtained by decoding the downlink traffic data. The first information includes an NACK instruction and aperiodic CQI information. Alternatively, the first information includes one NACK state of multiple NACK states, and different NACK states correspond to different CQI information.

An embodiment of the present disclosure further provides a UE. The UE includes a first processor, a first memory and a first communication bus.

The first communication bus is configured to implement connection and communication between the first processor and the first memory.

The first processor is configured to execute one or more programs stored in the first memory, so as to implement the steps of the CQI feedback enhancement method described above.

An embodiment of the present disclosure further provides a CQI feedback enhancement method. The method includes the steps described below.

Downlink traffic data is sent to a UE.

First information sent by the UE is received in a case where an error result is obtained by decoding the downlink traffic data. The first information includes an NACK instruction and aperiodic CQI information. Alternatively, the first information includes one NACK state of multiple NACK states, and different NACK states correspond to different CQI information.

An embodiment of the present disclosure further provides a CQI feedback enhancement device. The device includes a second sending module and a receiving module.

The second sending module is configured to send downlink traffic data to a UE.

The receiving module is configured to receive, in a case where an error result is obtained by decoding the downlink traffic data, first information sent by the UE. The first information includes an NACK instruction and aperiodic CQI information. Alternatively, the first information includes one NACK state of multiple NACK states, and different NACK states correspond to different CQI information.

An embodiment of the present disclosure further provides a base station. The base station includes a second processor, a second memory and a second communication bus.

The second communication bus is configured to implement connection and communication between the second processor and the second memory.

The second processor is configured to execute one or more programs stored in the second memory, so as to implement the steps of the CQI feedback enhancement method described above.

An embodiment of the present disclosure further provides a CQI feedback enhancement method. The method includes the steps described below.

A base station sends downlink traffic data to a UE.

The UE decodes the downlink traffic data.

First information is sent to the base station in a case where an error result is obtained by decoding the downlink traffic data. The first information includes an NACK instruction and aperiodic CQI information. Alternatively, the first information includes one NACK state of multiple NACK states, and different NACK states correspond to different CQI information.

The base station receives the first information.

An embodiment of the present disclosure further provides a CQI feedback enhancement system. The system includes a base station and a UE.

The base station is configured to send downlink traffic data to the UE, and receive, in a case where an error result is obtained by decoding the downlink traffic data, first information sent by the UE.

The UE is configured to decode the downlink traffic data, and send the first information to the base station in the case where an error result is obtained by decoding the downlink traffic data. The first information includes an NACK instruction and aperiodic CQI information. Alternatively, the first information includes one NACK state of multiple NACK states, and different NACK states correspond to different CQI information.

An embodiment of the present disclosure further provides a CQI feedback enhancement system. The CQI feedback enhancement system includes a third processor, a third memory and a third communication bus.

The third communication bus is configured to implement connection and communication between the third processor and the third memory.

The third processor is configured to execute one or more programs stored in the third memory, so as to implement the steps of the CQI feedback enhancement method described above.

An embodiment of the present application further provides a computer readable storage medium storing one or more programs. The one or more programs are executable by one or more processors to implement the steps of any above-mentioned CQI feedback enhancement method.

DETAILED DESCRIPTION

Embodiments of the present disclosure are further described below in detail in conjunction with the drawings and specific implementations. The embodiments described herein are merely intended to explain the present disclosure and are not intended to limit the present disclosure.

Embodiment One

Figure 1:
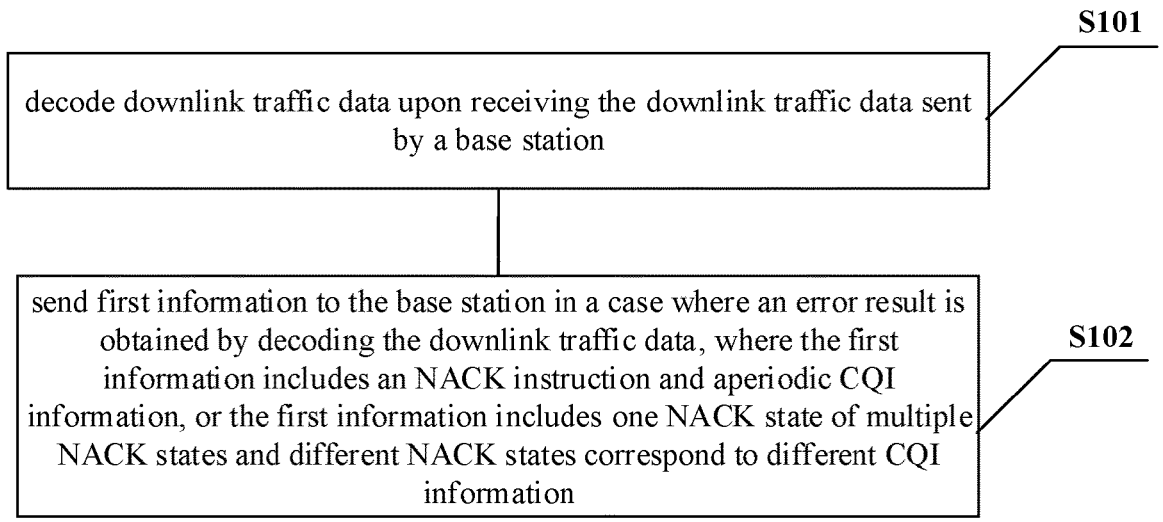
FIG. 1 is a schematic flowchart of a CQI feedback enhancement method on a UE side according to embodiment one of the present disclosure.

To solve the problem of large resource overheads and/or high latency in CQI reporting, a CQI feedback enhancement method is provided according to an embodiment of the present disclosure. The CQI feedback enhancement method provided by the embodiment is on a UE side. Referring to FIG. 1, the method includes steps described below.

S101 includes decoding downlink traffic data upon receiving the downlink traffic data sent by a base station.

S102 includes sending first information to the base station in a case where an error result is obtained by decoding the downlink traffic data. The first information includes an NACK instruction and aperiodic CQI information. Alternatively, the first information includes one NACK state of multiple NACK states, where different NACK states correspond to different CQI information.

After the base station receives the first information, the base station determines, according to the CQI information indicated by the first information, a parameter of a retransmission data packet and sends the retransmission data packet to the UE according to the determined parameter, so as to meet requirements for the reliability and latency of data transmission.

To transmit the downlink traffic data to the UE, the base station may determine an MCS for the downlink traffic data based on the CQI and other information reported by the UE, and the base station may perform modulation and coding on the downlink traffic data according to the selected MCS. After receiving the downlink traffic data transmitted by the base station, the UE may decode the downlink traffic data according to the MCS. If the UE decodes the downlink traffic data and obtains an error result, the UE sends an NACK to the base station. After receiving the NACK information, the base station sends the retransmission data packet to the UE. One reason for obtaining the error result by decoding the downlink traffic data by the UE is that: the CQI reporting information the base station refers to when the base station determines the MCS for the downlink traffic data cannot accurately reflect a CQI during downlink traffic data transmission. In view of this, there are solutions described below.

Solution 1: when the UE decodes the downlink traffic data and obtains an error result, the UE reports aperiodic CQI information to the base station while sending an NACK instruction to the base station; after the base station receives the NACK instruction and the CQI information, the base station determines, according to the CQI information, an MCS and other parameters of a retransmission data packet, so as to meet requirements for the reliability and latency of data transmission.

In the related art, for aperiodic CQI reporting, the base station needs to send control information to trigger the UE to perform reporting. The process includes: the control information is sent to the UE, the UE receives the control information, and sends an aperiodic CQI to the base station after measurement. In this way, the reported CQI approximates to a CQI during traffic data transmission, but aperiodic CQI reporting has complicated process and high latency, so the CQI reporting may fail to reach a traffic latency target. However, in solution 1 provided by the embodiment of the present disclosure, after obtaining the error result by decoding the downlink traffic data by the UE, the NACK instruction and the aperiodic CQI are simultaneously reported to the base station, leading to simpler process and lower latency, and the reported CQI information may be directly used when the data packet is retransmitted.

Solution 2: when the UE decodes the downlink traffic data and obtains an error result, the UE sends one NACK state to the base station, where there are multiple NACK states and different NACK states have a mapping relation with CQI information, i.e., different NACK states correspond to different CQI information; after the base station receives the one NACK state, the base station determines, according to CQI information corresponding to the one NACK state, an MCS and other parameters of a retransmission data packet, so as to meet requirements for the reliability and latency of data packet transmission.

In some embodiments, different NACK states corresponding to different CQI information in solution 2 includes: different NACK states corresponding to different first offset value information for correcting a CQI previously received by the base station, or different NACK states corresponding to different CQI reporting information. Here, the previously received CQI may be a proximate CQI previously received, or any CQI previously received; the same applies below.

In solution 2, the multiple NACK states may be referred to as multilevel NACKs. Each NACK state itself has a certain mapping relation with CQI information. Two mappings are exemplified below.

Mapping 1: each NACK state indicates a CQI offset value (that is, first offset value information for correcting the CQI previously received by the base station). The base station corrects the previously received CQI based on an offset value corresponding to the one NACK state fed back by the UE.

Mapping 2: each NACK state has a mapping relation with an indexed row in a CQI table. For example, NACK state 2 corresponds to a second row in the CQI table, and receiving NACK state 2 means that a current channel state is a channel state indicated by the second row in the CQI table.

In solution 2, there are multiple NACK states, and each state indicates that an error is obtained by decoding. Each state has a certain mapping relation with CQI information. The CQI information may be the offset value or a row index in the CQI table. After decoding the one NACK state, the base station may acquire the CQI information without decoding the CQI information separately. However, in solution 1, after the NACK instruction and the aperiodic CQI are received, only decoding error information is acquired by decoding the NACK instruction, while the CQI information is acquired by decoding the aperiodic CQI.

In solution 2, the first information (that is, the one NACK state of the multiple NACK states) sent to the base station by the UE may have 2 bits, 3 bits, 4 bits, 5 bits or the like, which is not limited in the embodiment. A description is given below using an example where the one NACK state has 4 bits. The one NACK state sent to the base station by the UE may be denoted in binary format. For example, 0000 denotes that the one NACK state is NACK0, and 0001 denotes the one NACK state is NACK1. However, in solution 1, when the UE decodes the downlink traffic data and obtains an error result, the NACK instruction sent to the base station by the UE only has one state. For ease of understanding, an example is given below to describe the case where the NACK instruction only has one state. For example, when the UE decodes the downlink traffic data and obtains a correct result, the UE sends an ACK denoted as 1 to the base station; and when the UE decodes the downlink traffic data and obtains an error result, the UE sends an NACK denoted as 0 to the base station. In this case, each of the ACK and the NACK has only one state.

An example is given below to describe solutions 1 and 2.

For example, a current CQI table is a 16-row table, which needs to be denoted by 4 bits. Different row indexes represent different channel state information.

In an instance corresponding to solution 1, when the UE decodes downlink traffic data and obtains an error result, the UE reports an aperiodic CQI to the base station while feeding back an NACK instruction to the base station. That is, the UE needs to feed back aperiodic CQI reporting having 4-bit overheads simultaneously when the UE feeds back the NACK instruction.

In an instance where mapping 2 is used in solution 2, when the UE decodes downlink traffic data and obtains an error result, the UE feeds back one NACK state to the base station. There are 15 NACK states denoted as NACK 0 to NACK 14. The multiple states have a direct mapping relation with CQI information. The mapping relation is represented by a 4-bit table. As shown in Table 1 below, CQI 0 to CQI 14 are indexes of 15 rows among 16 rows of a CQI table, and the last row is reserved and may represent an ACK state which does not carry CQI information, which is denoted as "reserved".

TABLE 1

Instance of a Mapping Relation between Multilevel NACKs and CQIs

| NACK State Index | CQI Index |
| --- | --- |
| NACK 0 | CQI 0 |
| NACK 1 | CQI 1 |
| NACK 2 | CQI 2 |
| NACK 3 | CQI 3 |
| NACK 4 | CQI 4 |
| NACK 5 | CQI 5 |
| NACK 6 | CQI 6 |
| NACK 7 | CQI 7 |
| NACK 8 | CQI 8 |
| NACK 9 | CQI 9 |
| NACK 10 | CQI 10 |
| NACK 11 | CQI 11 |
| NACK 12 | CQI 12 |
| NACK 13 | CQI 13 |
| NACK 14 | CQI 14 |
| reserved | reserved |

In an instance where mapping 1 is used in solution 2, when the UE decodes downlink traffic data and obtains an error result, the UE feeds back an NACK state to the base station, where there are 5 NACK states denoted as NACK 0 to NACK 4. Different states represent different offset values for correcting CQI information previously received. A relationship between NACK states and offset values is represented by a 3-bit table, which is shown by Table 2 below. Reserved states may represent different ACK states, which are denoted as "reserved".

TABLE 2

Instance of a Relationship between Multilevel
NACKs and CQI Correcting Offset Values

| NACK State Index | CQI Offset Value |
|---|---|
| NACK 0 | 0 |
| NACK 1 | −1 |
| NACK 2 | −3 |
| NACK 3 | −5 |
| NACK 4 | −7 |
| reserved | reserved |
| reserved | reserved |
| reserved | reserved |

When the UE decodes the downlink traffic data and obtains an error result, it is possible that channel quality information indicated by the CQI reported to the base station by the UE is higher than an actual CQI, so the CQI needs to be lowered. Therefore, NACK states denoted as NACK 1 to NACK 4 in Table 2 correspond to negative offset values for correcting the CQI.

The case where the UE decodes the downlink traffic data and obtains an error result is described above. A case where the UE decodes downlink traffic data and obtains a correct result is described below.

When the UE decodes the downlink traffic data and obtains a correct result, the UE sends second information to the base station. The second information includes an acknowledgement (ACK) instruction. Alternatively, the second information includes an ACK instruction and aperiodic CQI information. Alternatively, the second information includes one ACK state of multiple ACK states, where different ACK states correspond to different CQI information. The base station receives the second information.

To send the downlink traffic data to the UE, the base station may determine an MCS for the downlink traffic data based on the CQI and other information reported by the UE, and the base station may perform modulation and coding on the downlink traffic data according to the selected MCS. After the UE receives the downlink traffic data sent by the base station, the UE may decode the downlink traffic data according to the MCS. When the UE decodes the downlink traffic data and obtains a correct result, the UE feeds back an ACK to the base station. After the base station receives ACK feedback, it is indicated that transmission of the downlink traffic data is completed. The CQI Information may be carried simultaneously when the UE feeds back the ACK instruction to the base station. The base station may schedule a next traffic transmission with reference to the CQI information. In view of this, there are the solutions described below.

Solution 3: when the UE decodes downlink traffic data correctly, only an ACK instruction is fed back without carrying CQI information.

In some embodiments, when the UE feeds back an ACK/NACK to the base station, only the NACK state has a mapping relation with CQI information, while the ACK instruction merely indicates that the downlink traffic data is correctly decoded.

Solution 4: when the UE decodes downlink traffic data correctly, the UE reports aperiodic CQI information to the base station simultaneously when feeding back an ACK instruction to the base station. When the base station schedule a subsequent transmission, the base station determines, according to the CQI information, an MCS and other parameters for scheduling data, so as to meet requirements for the reliability and latency of data transmission.

Solution 5: when the UE decodes downlink traffic data correctly, the UE feeds back one ACK state to the base station. There are multiple ACK states. Different states have a mapping relation with CQI information. After the base station receives the one ACK state, the base station determines, according to CQI information corresponding to the one ACK state, an MCS and other parameters for scheduling a subsequent transmission, so as to meet requirements for the reliability and latency of data transmission.

In some embodiments, different ACK states corresponding to different CQI information in solution 5 includes: different ACK states corresponding to different second offset value information for correcting a CQI previously received by the base station, or different ACK states corresponding to different CQI reporting information. CQI reporting information may be aperiodic CQI reporting information.

In solution 5, the multiple ACK states may be referred to as multilevel ACKs. Each ACK state itself has a certain mapping relation with CQI information. Two mappings are exemplified below.

Mapping 3: each ACK state indicates a CQI offset value (that is, second offset value information for correcting the CQI previously received by the base station). The base station corrects the previously received CQI based on an offset value corresponding to the one ACK state fed back by the UE.

Mapping 4: each ACK state has a mapping relation with an indexed row in a CQI table. For example, ACK state 2 corresponds to a second row in the CQI table, and receiving ACK state 2 means that a current channel state is a channel state indicated by the second row in the CQI table.

In solution 5, there are multiple ACK states, and each state indicates that the decoding is correct. Each state has a certain mapping relation with CQI information. The CQI information may be the offset value or a row index in the CQI table. After decoding the one ACK state, the base station may acquire the CQI information without decoding the CQI information separately. However, in solution 4, after the ACK instruction and the aperiodic CQI are received, only decoding success information is acquired by decoding the ACK instruction, while the CQI information is acquired by decoding the aperiodic CQI.

In some embodiments, in the case where the second information includes the ACK instruction and the aperiodic CQI information or the second information includes the one ACK state, after the base station receives the second information, the method further includes that: the base station determines, according to the CQI information indicated by the second information, a parameter for scheduling a subsequent transmission.

An example is given below to describe solutions 3, 4 and 5.

For example, a current CQI table is a 16-row table, which needs to be denoted by 4 bits. Different row indexes represent different channel state information.

In an instance corresponding to solution 3, when the UE decodes downlink traffic data and obtains a correct result, only an ACK instruction is fed back without carrying any CQI information.

In an instance corresponding to solution 4, when the UE decodes downlink traffic data and obtains a correct result, the UE reports an aperiodic CQI to the base station while feeding back an ACK instruction to the base station. That is, the UE needs to feed back aperiodic CQI reporting having 4-bit overheads simultaneously while the UE feeds back the ACK instruction.

In an instance where mapping 4 is used in solution 5, when the UE decodes downlink traffic data and obtains a correct result, the UE feeds back one ACK state to the base station. There are 8 ACK states denoted as ACK 0 to ACK 7. The multiple states have a mapping relation with CQI information. A mapping relation is as shown in Table 3 below. CQI 0 to CQI 7 are indexes of 8 rows among 16 rows of a CQI table. The last 8 rows are reserved and may represent different NACK states, which are denoted as "reserved".

TABLE 3

Instance of a Mapping Relation between Multilevel ACKs and CQIs

| ACK State Index | CQI Index |
| --- | --- |
| ACK 0 | CQI 0 |
| ACK 1 | CQI 1 |
| ACK 2 | CQI 2 |
| ACK 3 | CQI 3 |
| ACK 4 | CQI 4 |
| ACK 5 | CQI 5 |
| ACK 6 | CQI 6 |
| ACK 7 | CQI 7 |
| reserved | reserved |
| reserved | reserved |
| reserved | reserved |
| reserved | reserved |
| reserved | reserved |
| reserved | reserved |
| reserved | reserved |
| reserved | reserved |

In an instance where mapping 3 is used in solution 5, when the UE decodes downlink traffic data and obtains a correct result, the UE feeds back an ACK state to the base station. There are 3 ACK states denoted as ACK 0 to ACK 2. Different states represent different offset values for correcting existing CQI information. A relationship between ACK states and offset values is represented by a 3-bit table, which is shown by Table 4 below. Reserved states may represent different NACK states, which are denoted as "reserved".

TABLE 4

Instance of a Relationship between Multilevel ACKs and CQI Correcting Offset Values

| ACK State Index | CQI Offset Value |
| --- | --- |
| ACK 0 | 0 |
| ACK 1 | 1 |
| ACK 2 | 3 |
| reserved | reserved |
| reserved | reserved |
| reserved | reserved |
| reserved | reserved |
| reserved | reserved |

When the UE decodes the downlink traffic data and obtains a correct result, it is possible that channel quality information indicated by the CQI reported to the base station by the UE is lower than an actual CQI, so the CQI needs to be raised to improve the utilization rate of resources. Therefore, ACK states denoted as ACK1 to ACK2 in Table 4 correspond to positive offset values for correcting the CQI.

In some embodiments, the base station sends downlink traffic data to the UE, and the UE determines to feed back an NACK or ACK according to a decoding result of the downlink traffic data. Feedback solutions for the same downlink traffic data may be free combinations of solution 1 or 2 for NACK and solution 3, 4 or 5 for ACK. That is, when the NACK is fed back for the downlink traffic data, any one of solutions 1 and 2 may be selected; and when the ACK is fed back for the downlink traffic data, any one of solutions 3, 4 and 5 may be selected, and a final feedback solution is a combination of the NACK feedback solution and the ACK feedback solution.

A block-error rate (BLER) of CQI information in first information and a BLER of CQI information in second information are described below. In some embodiments, the BLER of the CQI information in the first information and the BLER of the CQI information in the second information are determined according to a BLER of an MCS table used by the base station for sending downlink traffic data. That is, the BLER of the CQI information in the first information and the BLER of the CQI information in the second information are determined according to the following factor: a BLER of the MCS table used by the base station for sending the downlink traffic data.

In some embodiments, the BLER of the CQI information in the first information adopts one BLER in the MCS table, and the BLER of the CQI information in the second information adopts one BLER in the MCS table. A rule for determining the BLER of the CQI information in the first information and the BLER of the CQI information in the second information according to a BLER of the MCS table used by the base station for sending downlink traffic data includes the following modes: selecting any one BLER from the MCS table, or selecting a BLER in a sequential manner or a reverse sequential manner according to an arrangement sequence in the MCS table.

In some embodiments, the CQI information in the first information uses a CQI table corresponding to the smallest BLER in BLERs of the MCS table, and the CQI information in the second information uses a CQI table corresponding to the largest BLER in the BLERs of the MCS table. That is, in the NACK feedback, the strictest BLERn is selected as the BLER for CQI feedback; and in the ACK feedback, the loosest BLER1 is selected as the BLER for CQI feedback. Here, BLER1>BLER2> . . . >BLERn, n is a positive integer. In case of decoding errorly, it is indicated that the channel condition is poor, and it is necessary to feed back a CQI having a greater reliability of successful decoding. The smaller the BLER of a CQI, the higher the success rate of decoding. Therefore, the smallest BLER is selected.

In some embodiments, determining the BLER of the CQI information in the first information and the BLER of the CQI information in the second information according to a BLER of the MCS table used by the base station for sending the downlink traffic data includes: the BLER of the CQI information in the first information being the same as a BLER of an MCS used by the downlink traffic data, and the BLER of the CQI information in the second information being the same as a BLER of an MCS used by the downlink traffic data. That is, the BLER for feeding back the CQI is the same as a BLER of an MCS used by the downlink traffic data.

When the UE feeds back an ACK/NACK to the base station, CQI information in preceding solution 1 or 2 for NACK and CQI information in preceding solution 4 or 5 for ACK may be based on CQI tables of different BLERs. Similarly, MCS tables used by the base station for transmitting downlink traffic data may be based on different BLERs.

The BLER may have multiple values. Different BLERs are denoted as BLER1, BLER2, . . . and BLERn, where BLER1>BLER2> . . . >BLERn, and n is a positive integer. A BLER of a CQI table is determined according to the BLER of the MCS used by the base station for transmitting traffic data, and a specific solution is described below.

The UE feeds back an ACK/NACK to the base station. CQI information related to the ACK/NACK feedback uses a CQI table of BLERi, where $1 \le i \le n$. That is, a BLER of the CQI information in first information is one BLER in an MCS table, and a BLER of the CQI information in second information is one BLER of the MCS table.

In some embodiments, the UE feeds back an ACK to the base station, and CQI information related to the ACK feedback uses a CQI table of BLER1. That is, the CQI information in the second information uses a CQI table corresponding to the largest BLER in BLERs of the MCS table.

In some embodiments, the UE feeds back an NACK to the base station, and CQI information related to the NACK feedback uses a CQI table of BLERn. That is, the CQI information in the first information uses a CQI table corresponding to the smallest BLER in the BLERs of the MCS table.

In some embodiments, the BLER of the MCS table used for transmitting downlink traffic data to the UE by the base station is BLERj, the UE feeds back an ACK/NACK to the base station after decoding the downlink traffic data, and CQI information related to the ACK/NACK feedback uses a CQI table of BLERj, where $1 \le j \le n$. That is, the BLER of the CQI information in the first information is the same as a BLER of an MCS used by the downlink traffic data, and the BLER of the CQI information in the second information is the same as a BLER of an MCS used by the downlink traffic data.

An example is given below to describe the preceding solution.

For example, there are two kinds of BLER values for a CQI table and an MCS table, where $BLER1=10^{-1}$ and $BLER2=10^{-5}$.

No matter whether an MCS used by the base station for sending downlink traffic data to the UE belongs to an MCS table having a BLER of $10^{-1}$ or an MCS table having a BLER of $10^{-5}$, the UE feeds back an ACK/NACK to the base station after decoding the downlink traffic data, and CQI information related to the ACK/NACK uses a CQI table having a BLER of $10^{-1}$.

Alternatively, no matter whether the MCS used by the base station for sending downlink traffic data to the UE belongs to an MCS table having a BLER of $10^{-1}$ or an MCS table having a BLER of $10^{-5}$, the UE feeds back an ACK/NACK to the base station after decoding the downlink traffic data, and CQI information related to the ACK/NACK uses a CQI table having a BLER of $10^{-5}$.

In some embodiments, no matter whether the MCS used by the base station for sending downlink traffic data to the UE belongs to an MCS table having a BLER of $10^{-1}$ or an MCS table having a BLER of $10^{-5}$, the UE decodes the downlink traffic data correctly and feeds back an ACK to the base station, and CQI information related to the ACK uses a CQI table having a BLER of $10^{-1}$.

In some embodiments, no matter whether the MCS used by the base station for sending downlink traffic data to the UE belongs to an MCS table having a BLER of $10^{-1}$ or an MCS table having a BLER of $10^{-5}$, the UE decodes the downlink traffic data in error and feeds back an NACK to the base station, and CQI information related to the NACK feedback uses a CQI table having a BLER of $10^{-5}$.

If the MCS used by the base station for transmitting downlink traffic data to the UE belongs to an MCS table having a BLER of $10^{-1}$, the UE feeds back an ACK/NACK to the base station after decoding the downlink traffic data, and CQI information related to the ACK/NACK uses a CQI table having a BLER of $10^{-1}$. Similarly, if the MCS used by the base station for transmitting downlink traffic data to the UE belongs to an MCS table having a BLER of $10^{-5}$, the UE feeds back an ACK/NACK to the base station after decoding the downlink traffic data, and CQI information related to the ACK/NACK uses a CQI table having a BLER of $10^{-5}$.

The base station sends downlink traffic data to the UE, and the UE feeds back an NACK or ACK to the base station according to a decoding result. Any one of solutions 1 and 2 may be selected for the NACK feedback. Any one of solutions 3, 4 and 5 may be selected for the ACK feedback. A final feedback solution of the downlink traffic data decoding is formed by combining the NACK feedback solution and the ACK feedback solution. In the final feedback solution, the number of bits of NACK feedback may be greater than the number of bits of ACK feedback, and consequently, the UE and the base station may be not uniform in the understanding of the number of feedback bits. This affects the determination of a position where the base station detects feedback information. In view of the fact that ACK feedback information (that is, second information) and NACK feedback information (that is, first information) are not uniform in the number of bits, an embodiment of the present disclosure provides the three solutions described below.

Solution 6: in the case where decoding of downlink traffic data has a correct result and the number of bits of second information is less than the number of bits of first information, before the second information is sent to the base station, the method further includes: padding the second information so that the number of bits of the padded second information is equal to the number of bits of the first information.

In some embodiments, the step of padding the second information includes: performing zero-padding on the second information, or repeating a bit of the second information.

That is, when the number of bits of ACK feedback information is less than the number of bits of NACK feedback information, the ACK feedback information is padded. After the padding, the number of bits of the ACK information fed back to the base station by the UE is the same as the number of bits of the NACK information fed back to the base station by the UE. The padding may be performing zero-padding on the ACK feedback information, or repeating a bit of the ACK feedback information.

Solution 7: second information and first information each have n bits, m states of $2^n$ states have a mapping relation with CQIs, the number of ACK states in the $2^n$ states is denoted as x, the number of NACK states in the $2^n$ states is denoted as y, where $1 \le m \le 2^n$, $1 \le x \le 2^n$, $1 \le y \le 2^n$, $x+y=2^n$, and m, n, x and y are each a positive integer.

Solution 7 is applicable to at least the case where both the NACK and the ACK carry CQI information and the case where only the NACK carries CQI information and the ACK carries no CQI information.

Solution 8: the number of bits of second information is denoted as a, and the number of bits of first information is denoted as b, where a and b are each a positive integer; in the case where decoding of downlink traffic data has a correct result, a resource position for the second information is determined based on the number a of bits of the second information and a physical uplink control channel (PUCCH) resource indicated by the base station; in the case where the decoding of the downlink traffic data has an error result, a resource position for the first information is determined based on the number b of bits of the first information and a PUCCH resource indicated by the base station.

That is, solution 8 allows the ACK feedback information and the NACK feedback information to have different numbers of bits, where the number of bits of the ACK feedback information is a, and the number of bits of the NACK feedback information is b. When the UE feeds back the ACK, resource position #1 used by the feedback is determined based on the number a of information bits and the PUCCH resource indicated by the base station. When the UE feeds back the NACK, resource position #2 used by the feedback is determined based on the number b of information bits and the PUCCH resource indicated by the base station. Here, a may be equal to b, or may be different from b. When a=b, resource positions #1 and #2 represent the same resource. When a≠b, resource positions #1 and #2 represent different resources.

After the step of receiving the first information sent by the UE and/or receiving the second information sent by the UE, the method further includes that: the base station firstly detects the second information at the resource position for the second information, and then, in the case where no second information is detected at the resource position for the second information, the base station detects the first information at the resource position for the first information. That is, this solution for receiving an ACK/NACK by the base station has a smaller blind detection complexity. For example, in at least 90% detections, the second information can be detected at the resource position of the second information, and there is no need to detect the first information.

An example is given below to describe solutions 6, 7 and 8.

For example, when the UE feeds back an ACK/NACK and a CQI to the base station, only the NACK state carries CQI information, and there are 15 NACK states, where different states represent different CQI information, having 4-bit overheads; and the ACK carries no CQI information, and there is only one state, having 1-bit overhead, where the bit field is set to 1 and represents the ACK.

In an instance corresponding to solution 6, the number of bits of ACK feedback information is less than the number of bits of NACK feedback information. The ACK feedback is padded, and the number of bits of the padded ACK feedback information is the same as the number of bits of the NACK feedback information. If zero-padding is performed on the ACK feedback, state 1000 denotes that the decoding state is the ACK. If the bit of the ACK is repeated to pad the ACK feedback, state 1111 denotes that the decoding state is the ACK. In this case, the ACK uses 4 bits and occupies one state of 16 states, and an NACK occupies the remaining 15 states.

In an instance corresponding to solution 7, ACK/NACK feedback information occupies 4 bits. 15 states of 16 states have a mapping relation with CQIs. One state of the 16 states denotes that the feedback information is an ACK. The remaining 15 states denote NACKs. An ACK/NACK feedback solution is represented by a 4-bit table. As shown in Table 5 below, NACKs of the 15 states are denoted as NACK 0 to NACK 14, and each NACK state has a direct mapping relation with CQI information. CQI 0 to CQI 14 denote 15 row indexes in a 16-row CQI table. The ACK state, which does not carry CQI information, is represented as ACK 15, which is denoted as "reserved".

TABLE 5

Instance of a Mapping Relation between Multilevel NACKs and CQIs

| NACK State Index | CQI Index |
| --- | --- |
| NACK 0 | CQI 0 |
| NACK 1 | CQI 1 |
| NACK 2 | CQI 2 |
| NACK 3 | CQI 3 |
| NACK 4 | CQI 4 |
| NACK 5 | CQI 5 |
| NACK 6 | CQI 6 |
| NACK 7 | CQI 7 |
| NACK 8 | CQI 8 |
| NACK 9 | CQI 9 |
| NACK 10 | CQI 10 |
| NACK 11 | CQI 11 |
| NACK 12 | CQI 12 |
| NACK 13 | CQI 13 |
| NACK 14 | CQI 14 |
| ACK 15 | reserved |

In an instance corresponding to solution 8, an ACK feedback has 1-bit overhead, and an NACK feedback has 4-bit overheads. Resource position #1 used by the ACK feedback is determined based on the 1-bit overhead and a PUCCH resource indicated by the base station. Resource position #2 used by the NACK feedback is determined based on the 4-bit overheads and a PUCCH resource indicated by the base station.

According to the CQI feedback enhancement method provided by the embodiment of the present disclosure, in some implementation processes, the CQI reporting has not only smaller resource overheads but also low latency, implementing reliable CQI reporting and meeting strict requirements set in some scenarios for the reliability and low latency of data transmission.

Embodiment Two

Figure 2:
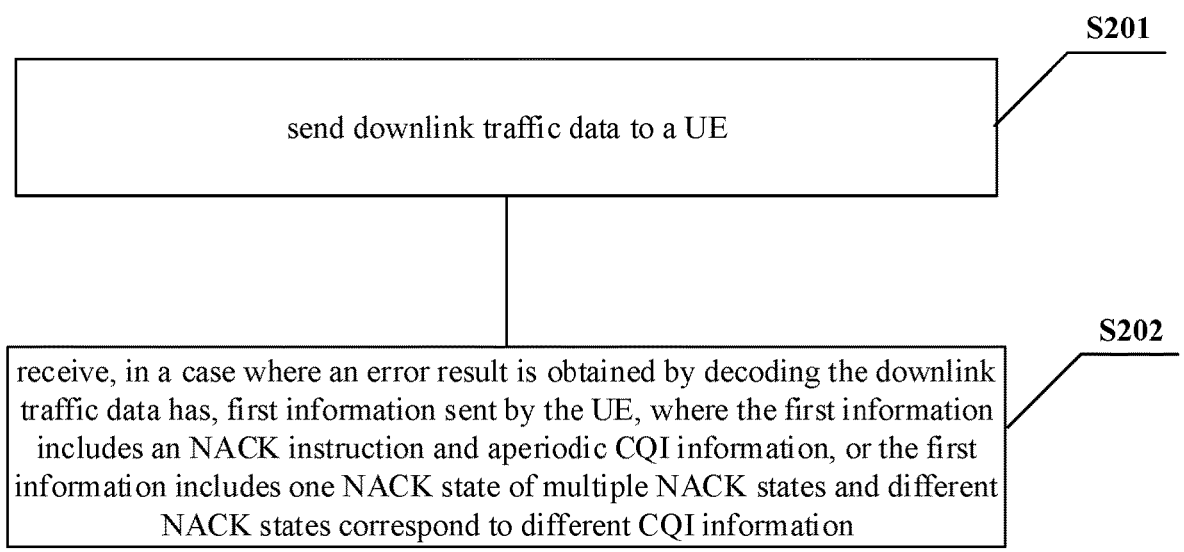
FIG. 2 is a schematic flowchart of a CQI feedback enhancement method on a base station side according to embodiment two of the present disclosure.

To solve the problem of large resource overheads and/or high latency in CQI reporting, a CQI feedback enhancement method is provided according to an embodiment of the present disclosure. The CQI feedback enhancement method provided by the embodiment is on a base station side. Referring to FIG. 2, the method includes steps described below.

S201 includes sending downlink traffic data to a UE.

S202 includes receiving first information sent by the UE in a case where an error result is obtained by decoding the downlink traffic data. The first information includes an NACK instruction and aperiodic CQI information. Alternatively, the first information includes one NACK state of multiple NACK states, where different NACK states correspond to different CQI information.

After the base station receives the first information, the base station determines, according to the CQI information indicated by the first information, a parameter of a retransmission data packet, and sends the retransmission data packet to the UE according to the determined parameter, so as to meet requirements for the reliability and latency of data transmission.

To transmit the downlink traffic data to the UE, the base station may determine an MCS for the downlink traffic data based on the CQI and other information reported by the UE, and the base station may perform modulation and coding on the downlink traffic data according to the selected MCS. After receiving the downlink traffic data transmitted by the base station, the UE may decode the downlink traffic data according to the MCS. If the UE decodes the downlink traffic data and obtains an error result, the UE sends an NACK to the base station. After receiving the NACK information, the base station sends the retransmission data packet to the UE. One reason for obtaining the error result by decoding the downlink traffic data by the UE is that: the CQI reporting information the base station refers to when the base station determines the MCS for the downlink traffic data cannot accurately reflect a CQI during downlink traffic data transmission. In view of this, there are solutions described below.

Solution 1: when the UE decodes the downlink traffic data and obtains an error result, the UE reports aperiodic CQI information to the base station while sending an NACK instruction to the base station; after the base station receives the NACK instruction and the CQI information, the base station determines, according to the CQI information, an MCS and other parameters of a retransmission data packet, so as to meet requirements for the reliability and latency of data transmission.

In the related art, for aperiodic CQI reporting, the base station needs to send control information to trigger the UE to perform reporting. The process includes: the control information is sent to the UE, the UE receives the control information, and sends an aperiodic CQI to the base station after measurement. In this way, the reported CQI approximates to a CQI during traffic data transmission, but aperiodic CQI reporting has complicated process and high latency, so the CQI reporting may fail to reach a traffic latency target. However, in solution 1 provided by the embodiment of the present disclosure, after obtaining the error result by decoding the downlink traffic data by the UE, the NACK instruction and the aperiodic CQI are simultaneously reported to the base station, leading to simpler process and lower latency, and the reported CQI information may be directly used when the data packet is retransmitted.

Solution 2: when the UE decodes the downlink traffic data and obtains an error result, the UE sends one NACK state to the base station, wherein there are multiple NACK states and different NACK states have a mapping relation with CQI information, i.e., different NACK states correspond to different CQI information; after the base station receives the one NACK state, the base station determines, according to CQI information corresponding to the one NACK state, an MCS and other parameters of a retransmission data packet, so as to meet requirements for the reliability and latency of data packet transmission.

In some embodiments, different NACK states corresponding to different CQI information in solution 2 includes: different NACK states corresponding to different first offset value information for correcting a CQI previously received by the base station, or different NACK states corresponding to different CQI reporting information. Here, the previously received CQI may be a proximate CQI previously received, or any CQI previously received; the same applies below.

In solution 2, the multiple NACK states may be referred to as multilevel NACKs. Each NACK state itself has a certain mapping relation with CQI information. Two mappings are exemplified below.

Mapping 1: each NACK state indicates a CQI offset value (that is, first offset value information for correcting the CQI previously received by the base station). The base station corrects the previously received CQI based on an offset value corresponding to the one NACK state fed back by the UE.

Mapping 2: each NACK state has a mapping relation with an indexed row in a CQI table. For example, NACK state 2 corresponds to a second row in the CQI table, and receiving NACK state 2 means that a current channel state is a channel state indicated by the second row in the CQI table.

In solution 2, there are multiple NACK states, and each state indicates that an error is obtained by decoding. Each state has a certain mapping relation with CQI information. The CQI information may be the offset value or a row index in the CQI table. After the base station decodes the one NACK state, the base station may acquire the CQI information without decoding the CQI information separately. However, in solution 1, after the NACK instruction and the aperiodic CQI are received, only decoding error information is acquired by decoding the NACK instruction, while the CQI information is acquired by decoding the aperiodic CQI.

In solution 2, the first information (that is, the one NACK state of the multiple NACK states) sent to the base station by the UE may have 2 bits, 3 bits, 4 bits, 5 bits or the like, which is not limited in the embodiment. A description is given below using an example where the one NACK state having 4 bits. The one NACK state sent to the base station by the UE may be denoted in binary format. For example, 0000 denotes that the one NACK state is NACK0, and 0001 denotes that the one NACK state is NACK1. However, in solution 1, when the UE decodes the downlink traffic data and obtains an error result, the NACK instruction sent to the base station by the UE only has one state. For ease of understanding, an example is given below to describe the case where the NACK instruction only has one state. For example, when the UE decodes the downlink traffic data and obtains a correct result, the UE sends an ACK denoted as 1 to the base station; and when the UE decodes the downlink traffic data and obtains an error result, the UE sends an NACK denoted as 0 to the base station. In this case, each of the ACK and the NACK has only one state.

An example is given below to describe solutions 1 and 2.

For example, a current CQI table is a 16-row table, which needs to be denoted by 4 bits, and different row indexes represent different channel state information.

In an instance corresponding to solution 1, when the UE decodes downlink traffic data and obtains an error result, the UE reports an aperiodic CQI to the base station while feeding back an NACK instruction to the base station. That is, the UE needs to feed back aperiodic CQI reporting having 4-bit overheads simultaneously when the UE feeds back the NACK instruction.

In an instance where mapping 2 is used in solution 2, when the UE decodes downlink traffic data and obtains an error result, the UE feeds back one NACK state to the base station. There are 15 NACK states denoted as NACK 0 to NACK 14. The multiple states have a direct mapping relation with CQI information. The mapping relation is represented by a 4-bit table. As shown in Table 1 below, CQI 0 to CQI 14 are indexes of 15 rows among 16 rows of a CQI table, and the last row is reserved and represent an ACK state which does not carry CQI information, which is denoted as "reserved".

TABLE 6

Instance of a Mapping Relation between
Multilevel NACKs and CQIs

| NACK State Index | CQI Index |
| --- | --- |
| NACK 0 | CQI 0 |
| NACK 1 | CQI 1 |
| NACK 2 | CQI 2 |
| NACK 3 | CQI 3 |
| NACK 4 | CQI 4 |
| NACK 5 | CQI 5 |
| NACK 6 | CQI 6 |
| NACK 7 | CQI 7 |
| NACK 8 | CQI 8 |
| NACK 9 | CQI 9 |
| NACK 10 | CQI 10 |
| NACK 11 | CQI 11 |
| NACK 12 | CQI 12 |
| NACK 13 | CQI 13 |
| NACK 14 | CQI 14 |
| reserved | reserved |

In an instance where mapping 1 is used in solution 2, when the UE decodes downlink traffic data and obtains an error result, the UE feeds back an NACK state to the base station, where there are 5 NACK states denoted as NACK 0 to NACK 4. Different states indicate different offset values for correcting CQI information previously received. A relationship between NACK states and offset values is represented by a 3-bit table, which is shown by Table 7 below. Reserved states may represent different ACK states, which are denoted as "reserved".

TABLE 7

Instance of a Relationship between Multilevel
NACKs and CQI Correcting Offset Values

| NACK State Index | CQI Offset Value |
| --- | --- |
| NACK 0 | 0 |
| NACK 1 | −1 |
| NACK 2 | −3 |
| NACK 3 | −5 |
| NACK 4 | −7 |
| reserved | reserved |
| reserved | reserved |
| reserved | reserved |

When the UE decodes the downlink traffic data and obtains an error result, it is possible that channel quality information indicated by the CQI reported to the base station by the UE is higher than an actual CQI, so the CQI needs to be lowered. Therefore, NACK states denoted as NACK 1 to NACK 4 in Table 7 correspond to negative offset values for correcting the CQI.

The case where the UE decodes the downlink traffic data and obtains an error result is described above. A case where the UE decodes downlink traffic data and obtains a correct result is described below.

When the UE decodes the downlink traffic data and obtains a correct result, the UE sends second information to the base station. The second information includes an ACK instruction. Alternatively, the second information includes an ACK instruction and aperiodic CQI information. Alternatively, the second information includes one ACK state of multiple ACK states, where different ACK states correspond to different CQI information. The base station receives the second information.

To send the downlink traffic data to the UE, the base station may determine an MCS for the downlink traffic data based on the CQI and other information reported by the UE, and the base station may perform modulation and coding on the downlink traffic data according to the selected MCS. After the UE receives the downlink traffic data sent by the base station, the UE may decode the downlink traffic data according to the MCS. When the UE decodes the downlink traffic data and obtains a correct result, the UE feeds back an ACK to the base station. After the base station receives the ACK feedback, it is indicated that transmission of the downlink traffic data is completed. The CQI information may be carried simultaneously when the UE feeds back the ACK instruction to the base station. The base station may schedule a next traffic transmission with reference to the CQI information. In view of this, there are the solutions described below.

Solution 3: when the UE decodes downlink traffic data correctly, only an ACK instruction is fed back without carrying CQI information.

In some embodiments, when the UE feeds back an ACK/NACK to the base station, only the NACK state has a mapping relation with CQI information, while the ACK instruction merely indicates that the downlink traffic data is correctly decoded.

Solution 4: when the UE decodes downlink traffic data correctly, the UE reports aperiodic CQI information to the base station simultaneously when feeding back an ACK instruction to the base station. When the base station schedules a subsequent transmission, the base station determines, according to the CQI information, an MCS and other parameters for scheduling data, so as to meet requirements for the reliability and latency of data transmission.

Solution 5: when the UE decodes downlink traffic data correctly, the UE feeds back one ACK state to the base station. There are multiple ACK states. Different states have a mapping relation with CQI information. After the base station receives the one ACK state, the base station determines, according to CQI information corresponding to the one ACK state, an MCS and other parameters for scheduling a subsequent transmission, so as to meet requirements for the reliability and latency of data transmission.

In some embodiments, different ACK states corresponding to different CQI information in solution 5 includes: different ACK states corresponding to different second offset value information for correcting a CQI previously received by the base station, or different ACK states corresponding to different CQI reporting information. CQI reporting information may be aperiodic CQI reporting information.

In solution 5, the multiple ACK states may be referred to as multilevel ACKs. Each ACK state itself has a certain mapping relation with CQI information. Two mappings are exemplified below.

Mapping 3: each ACK state indicates a CQI offset value (that is, second offset value information for correcting the CQI previously received by the base station). The base station corrects the previously receive CQI based on an offset value corresponding to the one ACK state fed back by the UE.

Mapping 4: each ACK state has a mapping relation with an indexed row in a CQI table. For example, ACK state 2 corresponds to a second row in the CQI table, and receiving ACK state 2 means that a current channel state is a channel state indicated by the second row in the CQI table.

In solution 5, there are multiple ACK states, and each state indicates that the decoding is correct. Each state has a certain mapping relation with CQI information. The CQI information may be the offset value or a row index in the CQI table. After decoding the one ACK state, the base station may acquire the CQI information without decoding the CQI information separately. However, in solution 4, after the ACK instruction and the aperiodic CQI are received, only decoding success information is acquired by decoding the ACK instruction, while the CQI information is acquired by decoding the aperiodic CQI.

In some embodiments, in the case where the second information includes the ACK instruction and the aperiodic CQI information or the second information includes the one ACK state, after the base station receives the second information, the method further includes that: the base station determines, according to the CQI information indicated by the second information, a parameter for scheduling a subsequent transmission.

An example is given below to describe solutions 3, 4 and 5.

For example, a current CQI table is a 16-row table, which needs to be denoted by 4 bits, and different row indexes represent different channel state information.

In an instance corresponding to solution 3, when the UE decodes downlink traffic data and obtains a correct result, only an ACK instruction is fed back without carrying any CQI information.

In an instance corresponding to solution 4, when the UE decodes downlink traffic data and obtains a correct result, the UE reports an aperiodic CQI to the base station while feeding back an ACK instruction to the base station. That is, the UE needs to feed back aperiodic CQI reporting having 4-bit overheads simultaneously while the UE feeds back the ACK instruction.

In an instance where mapping 4 is used in solution 5, when the UE decodes downlink traffic data and obtains a correct result, the UE feeds back one ACK state to the base station. There are 8 ACK states denoted as ACK 0 to ACK 7. The multiple states have a mapping relation with CQI information. The mapping relation is as shown in Table 8 below. CQI 0 to CQI 7 are indexes of 8 rows among 16 rows of a CQI table. The last 8 rows are reserved and may represent different NACK states, which are denoted as "reserved".

TABLE 8

Instance of a Mapping Relation between
Multilevel NACKs and CQIs

| NACK State Index | CQI Index |
|---|---|
| ACK 0 | CQI 0 |
| ACK 1 | CQI 1 |
| ACK 2 | CQI 2 |
| ACK 3 | CQI 3 |
| ACK 4 | CQI 4 |
| ACK 5 | CQI 5 |
| ACK 6 | CQI 6 |
| ACK 7 | CQI 7 |
| reserved | reserved |
| reserved | reserved |
| reserved | reserved |
| reserved | reserved |
| reserved | reserved |
| reserved | reserved |
| reserved | reserved |
| reserved | reserved |

In an instance where mapping 3 is used in solution 5, when the UE decodes downlink traffic data and obtains a correct result, the UE feeds back an ACK state to the base station. There are 3 ACK states denoted as ACK 0 to ACK 2. Different states represent different offset values for correcting existing CQI information. A relationship between ACK states and offset values is indicated by a 3-bit table, which is shown by Table 9 below. Reserved states may represent different NACK states, which are denoted as "reserved".

TABLE 9

Instance of a Relationship between Multilevel
ACKs and CQI Correcting Offset Values

| ACK State Index | CQI Offset Value |
|---|---|
| ACK 0 | 0 |
| ACK 1 | 1 |
| ACK 2 | 3 |
| reserved | reserved |
| reserved | reserved |
| reserved | reserved |
| reserved | reserved |
| reserved | reserved |

When the UE decodes the downlink traffic data and obtains a correct result, it is possible that channel quality information indicated by the CQI reported to the base station by the UE is lower than an actual CQI, so the CQI needs to be raised to improve the utilization rate of resources. Therefore, ACK states denoted as ACK 1 to ACK 2 in Table 9 correspond to positive offset values for correcting the CQI.

In some embodiments, the base station sends downlink traffic data to the UE, and the UE determines to feed back an NACK or ACK according to a decoding result of the downlink traffic data. Feedback solutions for the same downlink traffic data may be free combinations of solution 1 or 2 for NACK and solution 3, 4 or 5 for ACK. That is, when the NACK is fed back for the downlink traffic data, any one of solutions 1 and 2 may be selected; and when the ACK is fed back for the downlink traffic data, any one of solutions 3, 4 and 5 may be selected. A final feedback solution is a combination of the NACK feedback solution and the ACK feedback solution.

A BLER of CQI information in first information and a BLER of CQI information in second information are described below.

In some embodiments, the BLER of the CQI information in the first information and the BLER of the CQI information in the second information are determined according to a BLER of an MCS table used by the base station for sending downlink traffic data. That is, the BLER of the CQI information in the first information and the BLER of the CQI information in the second information are determined according to the following factor: a BLER of the MCS table used by the base station for sending the downlink traffic data.

In some embodiments, the BLER of the CQI information in the first information adopts one BLER in the MCS table, and the BLER of the CQI information in the second information adopts one BLER in the MCS table. A rule for determining the BLER of the CQI information in the first information and the BLER of the CQI information in the second information according to a BLER of the MCS table used by the base station for sending the downlink traffic data includes the following modes: selecting any one BLER from the MCS table, or selecting a BLER in a sequential manner or a reverse sequential manner according to an arrangement sequence in the MCS table.

In some embodiments, the CQI information in the first information uses a CQI table corresponding to the smallest BLER in BLERs of the MCS table, and the CQI information in the second information uses a CQI table corresponding to the largest BLER in the BLERs of the MCS table. That is, in NACK feedback, the strictest BLERn is selected as the BLER for CQI feedback, and in ACK feedback, the loosest BLER1 is selected as the BLER for CQI feedback, where BLER1>BLER2> . . . >BLERn, and n is a positive integer. In case of decoding errorly, it is indicated that the channel condition is poor, and it is necessary to feed back a CQI having a higher reliability for successful decoding. The smaller the BLER of a CQI, the higher the success rate of decoding. Therefore, the smallest BLER is selected.

In some embodiments, determining the BLER of the CQI information in the first information and the BLER of the CQI information in the second information according to a BLER of the MCS table used by the base station for sending the downlink traffic data includes: the BLER of the CQI information in the first information being the same as a BLER of an MCS used by the downlink traffic data, and the BLER of the CQI information in the second information being the same as a BLER of an MCS used by the downlink traffic data. That is, the BLER for feeding back the CQI is the same as a BLER of an MCS used by the downlink traffic data.

When the UE feeds back an ACK/NACK to the base station, CQI information in preceding solution 1 or 2 for NACK and CQI information in preceding solution 4 or 5 for ACK may be based on CQI tables of different BLERs. Similarly, MCS tables used by the base station for transmitting downlink traffic data may be based on different BLERs. The BLER may have multiple values. Different BLERs are denoted as BLER1, BLER2, . . . and BLERn, where BLER1>BLER2> . . . >BLERn, and n is a positive integer. A BLER of a CQI table is determined according to the BLER of the MCS used by the base station for transmitting traffic data, and a specific solution is described below.

The UE feeds back an ACK/NACK to the base station. CQI information related to the ACK/NACK feedback uses a CQI table of BLERi, where $1 \leq i \leq n$. That is, the BLER of the CQI information in the first information is one BLER in an MCS table, and the BLER of the CQI information in the second information is one BLER of the MCS table.

In some embodiments, the UE feeds back an ACK to the base station, and CQI information related to the ACK feedback uses a CQI table of BLER1. That is, the CQI information in the second information uses a CQI table corresponding to the largest BLER in BLERs of the MCS table.

In some embodiments, the UE feeds back an NACK to the base station, and CQI information related to the NACK feedback uses a CQI table of BLERn. That is, the CQI information in the first information uses a CQI table corresponding to the smallest BLER in the BLERs of the MCS table.

In some embodiments, the BLER of the MCS table used for transmitting downlink traffic data to the UE by the base station is BLERj, the UE feeds back an ACK/NACK to the base station after decoding the downlink traffic data, and CQI information related to the ACK/NACK feedback uses a CQI table of BLERj, where $1 \leq j \leq n$. That is, the BLER of the CQI information in the first information is the same as a BLER of an MCS used by the downlink traffic data, and the BLER of the CQI information in the second information is the same as a BLER of an MCS used by the downlink traffic data.

An example is given below to describe the preceding solution.

For example, there are two kinds of BLER values for each of a CQI table and an MCS table, where BLER1=$10^{-1}$ and BLER2=$10^{-5}$.

No matter whether an MCS used by the base station for sending downlink traffic data to the UE belongs to an MCS table having a BLER of $10^{-1}$ or an MCS table having a BLER of $10^{-5}$, the UE feeds back an ACK/NACK to the base station after decoding the downlink traffic data, and CQI information related to the ACK/NACK uses a CQI table having a BLER of $10^{-1}$.

Alternatively, no matter whether the MCS used by the base station for sending downlink traffic data to the UE belongs to an MCS table having a BLER of $10^{-1}$ or an MCS table having a BLER of $10^{-5}$, the UE feeds back an ACK/NACK to the base station after decoding the downlink traffic data, and CQI information related to the ACK/NACK uses a CQI table having a BLER of $10^{-5}$.

In some embodiments, no matter whether the MCS used by the base station for sending downlink traffic data to the UE belongs to an MCS table having a BLER of $10^{-1}$ or an MCS table having a BLER of $10^{-5}$, the UE decodes the downlink traffic data correctly and feeds back an ACK to the base station, and CQI information related to the ACK uses a CQI table having a BLER of $10^{-1}$.

In some embodiments, no matter whether the MCS used by the base station for sending downlink traffic data to the UE belongs to an MCS table having a BLER of $10^{-1}$ or an MCS table having a BLER of $10^{-5}$, the UE decodes the downlink traffic data in error and feeds back an NACK to the base station, and CQI information related to the NACK feedback uses a CQI table having a BLER of $10^{-5}$.

If the MCS used by the base station for transmitting downlink traffic data to the UE belongs to an MCS table having a BLER of $10^{-1}$, the UE feeds back an ACK/NACK to the base station after decoding the downlink traffic data, and CQI information related to the ACK/NACK uses a CQI table having a BLER of $10^{-1}$. Similarly, if the MCS used by the base station for transmitting downlink traffic data to the UE belongs to an MCS table having a BLER of $10^{-5}$, the UE feeds back an ACK/NACK to the base station after decoding the downlink traffic data, and CQI information related to the ACK/NACK uses a CQI table having a BLER of $10^{-5}$.

The base station sends downlink traffic data to the UE, and the UE feeds back an NACK or ACK to the base station according to a decoding result. Any one of solutions 1 and 2 may be selected for the NACK feedback. Any one of solutions 3, 4 and 5 may be selected for the ACK feedback. A final feedback solution of downlink traffic data decoding is formed by combining the NACK feedback solution and the ACK feedback solution. In the final feedback solution, the number of bits of NACK feedback may be greater than the number of bits of ACK feedback, and consequently, the UE and the base station may be not uniform in the understanding of the number of feedback bits. This affects the determination of a position where the base station detects feedback information. In view of the fact that ACK feedback information (that is, second information) and NACK feedback information (that is, first information) are not uniform in the number of bits, an embodiment of the present disclosure provides the three solutions described below.

Solution 6: in the case where decoding of downlink traffic data has a correct result and the number of bits of second information is less than the number of bits of first information, before the step of sending the second information to the base station, the method further includes: padding the second information so that the number of bits of the padded second information is equal to the number of bits of the first information.

In some embodiments, the step of padding the second information includes: performing zero-padding on the second information, or repeating a bit of the second information.

That is, when the number of bits of ACK feedback information is less than the number of bits of NACK feedback information, the ACK feedback information is padded. After the padding, the number of bits of the ACK information fed back to the base station by the UE is the same as the number of bits of the NACK information fed back to the base station by the UE. The padding may be performing zero-padding on the ACK feedback information, or repeating a bit of the ACK feedback information.

Solution 7: second information and first information each have n bits, m states of $2^n$ states have a mapping relation with CQIs, the number of ACK states in the $2^n$ states is denoted as x, the number of NACK states in the $2^n$ states is denoted as y, where $1 \leq m \leq 2^n$, $1 \leq x \leq 2^n$, $1 \leq y \leq 2^n$, $x+y=2^n$, and m, n, x and y are each a positive integer.

Solution 7 is applicable to at least the case where both an NACK and an ACK carry CQI information and the case where only an NACK carries CQI information and an ACK carries no CQI information.

Solution 8: the number of bits of second information is denoted as a, and the number of bits of first information is denoted as b, where a and b are each a positive integer; in the case where decoding of downlink traffic data has a correct result, a resource position for the second information is determined based on the number a of bits of the second information and a physical uplink control channel (PUCCH) resource indicated by the base station; in the case where the decoding of downlink traffic data has an error result, a resource position for the first information is determined based on the number b of bits of the first information and a PUCCH resource indicated by the base station.

That is, solution 8 allows ACK feedback information and NACK feedback information to have different numbers of bits, where the number of bits of the ACK feedback information is a, and the number of bits of the NACK feedback information is b. When the UE feeds back the ACK, resource position #1 used by the feedback is determined based on the number a of information bits and the PUCCH resource indicated by the base station. When the UE feeds back the NACK, resource position #2 used by the feedback is determined based on the number b of information bits and the PUCCH resource indicated by the base station. Here, a may be equal to b, or different from b. When a=b, resource positions #1 and #2 represent the same resource. When a≠b, resource positions #1 and #2 represent different resources.

After the step of receiving the first information sent by the UE and/or receiving the second information sent by the UE, the method further includes that: the base station firstly detects the second information at the resource position for the second information, and then, in the case where no second information is detected at the resource position for the second information, the base station detects the first information at the resource position for the first information. That is, this solution for receiving an ACK/NACK by the base station has a smaller blind detection complexity. For example, in at least 90% detections, the second information can be detected at the resource position of the second information, and there is no need to detect the first information.

An example is given below to describe solutions 6, 7 and 8.

For example, when the UE feeds back an ACK/NACK and a CQI to the base station, only the NACK state carries CQI information, and here are 15 NACK states, where different states represent different CQI information, having 4-bit overhead; and the ACK carries no CQI information, and there is only one state, having 1-bit overheads, where the bit field is set to 1 and represents the ACK.

In an instance corresponding to solution 6, the number of bits of ACK feedback information is less than the number of bits of NACK feedback information. The ACK feedback is padded, and the number of bits in the padded ACK feedback information is the same as the number of bits in the NACK feedback information. If zero-padding is performed on the ACK feedback, state 1000 denotes that the decoding state is an ACK. If the bit of the ACK is repeated to pad the ACK feedback, state 1111 denotes that the decoding state is the ACK. In this case, the ACK uses 4 bits and occupies one state of 16 states, and an NACK occupies the remaining 15 states.

In an instance corresponding to solution 7, ACK/NACK feedback information has 4 bits. 15 states of 16 states have a mapping relation with CQIs. One state of the 16 states denotes that the feedback information is an ACK. The remaining 15 states denote NACKs. An ACK/NACK feedback solution is represented by a 4-bit table. As shown in Table 10 below, 15 NACK states are denoted as NACK 0 to NACK 14, and each NACK state has a direct mapping relation with CQI information. CQI 0 to CQI 14 denote 15 row indexes in a 16-row CQI table. An ACK state, which does not carry CQI information, is represented as ACK 15, which is denoted as "reserved".

TABLE 10

Instance of a Mapping Relation between Multilevel NACKs and CQIs

| NACK State Index | CQI Index |
|---|---|
| NACK 0 | CQI 0 |
| NACK 1 | CQI 1 |
| NACK 2 | CQI 2 |
| NACK 3 | CQI 3 |
| NACK 4 | CQI 4 |
| NACK 5 | CQI 5 |
| NACK 6 | CQI 6 |
| NACK 7 | CQI 7 |
| NACK 8 | CQI 8 |
| NACK 9 | CQI 9 |
| NACK 10 | CQI 10 |
| NACK 11 | CQI 11 |
| NACK 12 | CQI 12 |
| NACK 13 | CQI 13 |
| NACK 14 | CQI 14 |
| ACK 15 | reserved |

In an instance corresponding to solution 8, ACK feedback has 1-bit overhead, and NACK feedback has 4-bit overheads. Resource position #1 used by the ACK feedback is determined based on the 1-bit overhead and a PUCCH resource indicated by the base station. Resource position #2 used by the NACK feedback is determined based on the 4-bit overheads and a PUCCH resource indicated by the base station.

According to the CQI feedback enhancement method provided by the embodiment of the present disclosure, in some implementation processes, the CQI reporting has not only smaller resource overheads but also low latency, implementing reliable CQI reporting and meeting strict requirements set in some scenarios for the reliability and low latency of data transmission.

Embodiment Three

Figure 3:
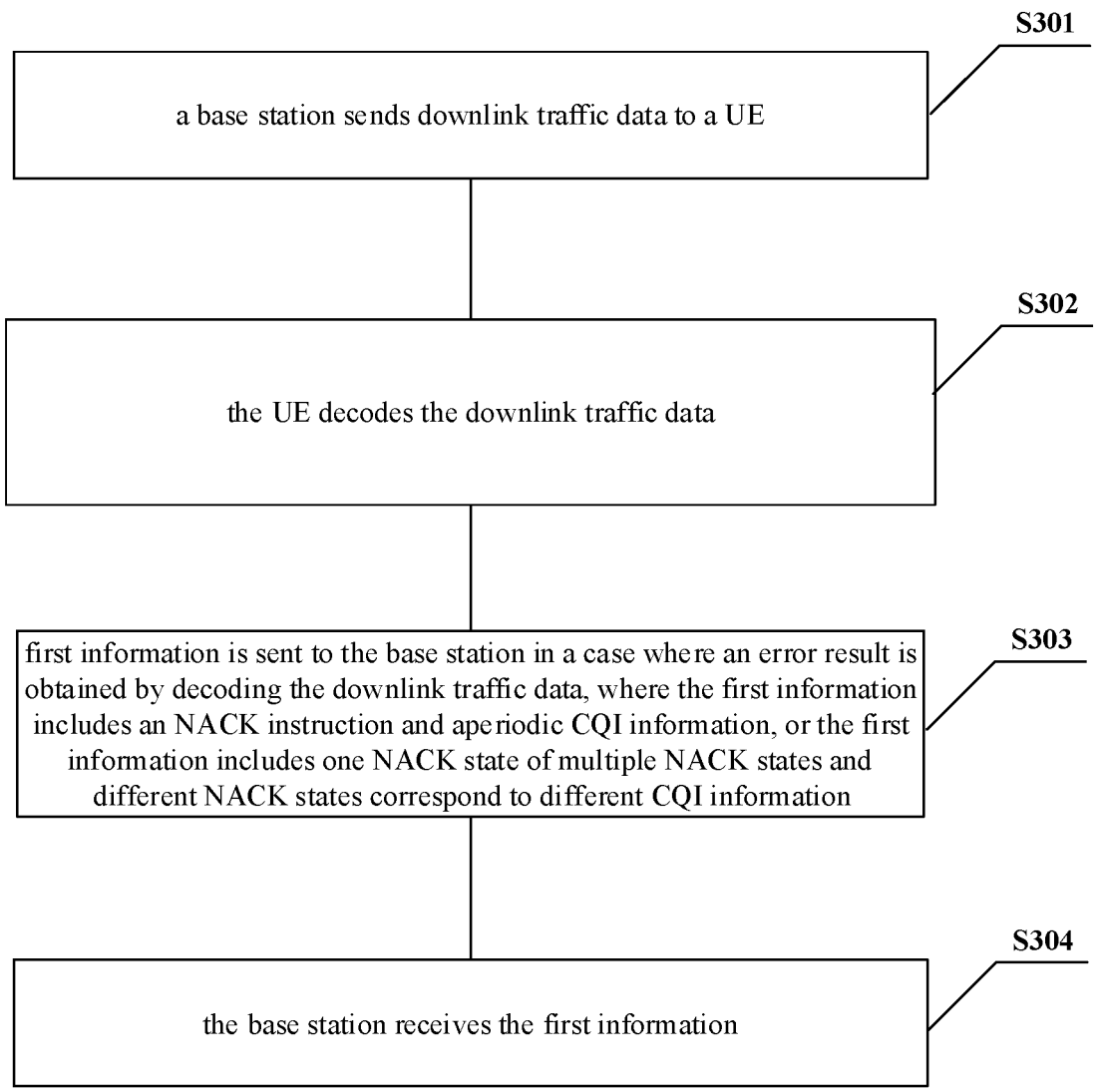
FIG. 3 is a schematic flowchart of a CQI feedback enhancement method of a system according to embodiment three of the present disclosure.

To solve the problem of large resource overheads and/or high latency in CQI reporting, a CQI feedback enhancement method is provided according to an embodiment of the present disclosure. The CQI feedback enhancement method provided by the embodiment is on a system. The system includes a base station and a UE. Referring to FIG. 3, the method includes steps described below.

In step S301, the base station sends downlink traffic data to the UE.

In step S302, the UE decodes the downlink traffic data.

In step S303, first information is sent to the base station in a case where an error result is obtained by decoding the downlink traffic data. The first information includes an NACK instruction and aperiodic CQI information. Alternatively, the first information includes one NACK state of multiple NACK states, where different NACK states correspond to different CQI information.

In step S304, the base station receives the first information.

After the base station receives the first information in step S304, the base station determines, according to the CQI information indicated by the first information, a parameter of a retransmission data packet, and sends the retransmission data packet to the UE according to the determined parameter, so as to meet requirements for the reliability and latency of data transmission.

To transmit the downlink traffic data to the UE, the base station may determine an MCS for the downlink traffic data based on the CQI and other information reported by the UE, and the base station may perform modulation and coding on the downlink traffic data according to the selected MCS. After receiving the downlink traffic data transmitted by the base station, the UE may decode the downlink traffic data according to the MCS. If the UE decodes the downlink traffic data and obtains an error result, the UE sends an NACK to the base station. After receiving the NACK information, the base station sends the retransmission data packet to the UE. One reason for obtaining the error result by decoding the downlink traffic data by the UE is that: the CQI reporting information the base station refers to when the base station determines the MCS for the downlink traffic data cannot accurately reflect a CQI during downlink traffic data transmission. In view of this, there are solutions described below.

Solution 1: when the UE decodes the downlink traffic data and obtains an error result, the UE reports aperiodic CQI information to the base station while sending an NACK instruction to the base station; after the base station receives the NACK instruction and the CQI information, the base station determines, according to the CQI information, an MCS and other parameters of a retransmission data packet, so as to meet requirements for the reliability and latency of data transmission.

In the related art, for aperiodic CQI reporting, the base station needs to send control information to trigger the UE to perform reporting. The process includes: the control information is sent to the UE, the UE receives the control information, and sends an aperiodic CQI to the base station after measurement. In this way, the reported CQI approximates to a CQI during traffic data transmission, but aperiodic CQI reporting has complicated process and high latency, so the CQI reporting may fail to reach a traffic latency target. However, in solution 1 provided by the embodiment of the present disclosure, after obtaining the error result by decoding the downlink traffic data by the UE, the NACK instruction and the aperiodic CQI are simultaneously reported to the base station, leading to simpler process and lower latency, and the reported CQI information may be directly used when the data packet is retransmitted.

Solution 2: when the UE decodes the downlink traffic data and obtains an error result, the UE sends one NACK state to the base station, where there are multiple NACK states and different NACK states have a mapping relation with CQI information, i.e., different NACK states correspond to different CQI information; after the base station receives the one NACK state, the base station determines, according to CQI information corresponding to the one NACK state, an MCS and other parameters of a retransmission data packet, so as to meet requirements for the reliability and latency of data packet transmission.

In some embodiments, different NACK states corresponding to different CQI information in solution 2 includes: different NACK states corresponding to different first offset value information for correcting a CQI previously received by the base station, or different NACK states corresponding to different CQI reporting information. Here, the previously received CQI may be a proximate CQI previously received, or any CQI previously received; the same applies below.

In solution 2, the multiple NACK states may be referred to as multilevel NACKs. Each NACK state itself has a certain mapping relation with CQI information. Two mappings are exemplified below.

Mapping 1: each NACK state indicates a CQI offset value (that is, first offset value information for correcting the CQI previously received by the base station). The base station corrects the previously receive CQI based on an offset value corresponding to the one NACK state fed back by the UE.

Mapping 2: each NACK state has a mapping relation with an indexed row in a CQI table. For example, NACK state 2 corresponds to a second row in the CQI table, and receiving NACK state 2 means that a current channel state is a channel state indicated by the second row in the CQI table.

In solution 2, there are multiple NACK states, and each state indicates that an error is obtained by decoding. Each state has a certain mapping relation with CQI information. The CQI information may be the offset value or a row index in the CQI table. After the base station decodes the NACK state, the base station may acquire the CQI information without decoding the CQI information separately. However, in solution 1, after the NACK instruction and the aperiodic CQI are received, only decoding error information is acquired by decoding the NACK instruction, while the CQI information is acquired by decoding the aperiodic CQI.

In solution 2, the first information (that is, the one NACK state of the multiple NACK states) sent to the base station by the UE may have 2 bits, 3 bits, 4 bits, 5 bits or the like, which is not limited in the embodiment. A description is given below using an example where the one NACK has 4 bits. The one NACK state sent to the base station by the UE may be denoted in binary format. For example, 0000 denotes that the one NACK state is NACK0, and 0001 denotes that the one NACK state is NACK1. However, in solution 1, when the UE decodes the downlink traffic data and obtains an error result, the NACK instruction sent to the base station by the UE only has one state. For ease of understanding, an example is given below to describe the case where the NACK instruction only has one state. For example, when the UE decodes the downlink traffic data and obtains a correct result, the UE sends an ACK denoted as 1 to the base station; and when the UE decodes the downlink traffic data and obtains an error result, the UE sends an NACK denoted as 0 to the base station. In this case, each of the ACK and the NACK has only one state.

An example is given below to describe solutions 1 and 2.

For example, a current CQI table is a 16-row table, which needs to be denoted by 4 bits, and different row indexes represent different channel state information.

In an instance corresponding to solution 1, when the UE decodes downlink traffic data and obtains an error result, the UE reports an aperiodic CQI to the base station while feeding back an NACK instruction to the base station. That is, the UE needs to feed back aperiodic CQI reporting having 4-bit overheads simultaneously when the UE feeds back the NACK instruction.

In an instance where mapping 2 is used in solution 2, when the UE decodes downlink traffic data and obtains an error result, the UE feeds back one NACK state to the base station. There are 15 NACK states denoted as NACK 0 to NACK 14. The multiple states have a direct mapping relation with CQI information. The mapping relation is represented by a 4-bit table. As shown in Table 11 below, CQI 0 to CQI 14 are indexes of 15 rows among 16 rows of a CQI table, and the last row is reserved and may represent an ACK state which does not carry CQI information, which is denoted as "reserved".

TABLE 11

Instance of a Mapping Relation between Multilevel NACKs and CQIs

| NACK State Index | CQI Index |
| --- | --- |
| NACK 0 | CQI 0 |
| NACK 1 | CQI 1 |
| NACK 2 | CQI 2 |
| NACK 3 | CQI 3 |
| NACK 4 | CQI 4 |
| NACK 5 | CQI 5 |
| NACK 6 | CQI 6 |
| NACK 7 | CQI 7 |
| NACK 8 | CQI 8 |
| NACK 9 | CQI 9 |
| NACK 10 | CQI 10 |
| NACK 11 | CQI 11 |
| NACK 12 | CQI 12 |
| NACK 13 | CQI 13 |
| NACK 14 | CQI 14 |
| reserved | reserved |

In an instance where mapping 1 is used in solution 2, when the UE decodes downlink traffic data and obtains an error result, the UE feeds back an NACK state to the base station, where there are 5 NACK states denoted as NACK 0 to NACK 4. Different states represent different offset values for correcting CQI information previously received. A relationship between NACK states and offset values is represented by a 3-bit table, which is shown by Table 12 below. Reserved states may represent different ACK states, which are denoted as "reserved".

TABLE 12

Instance of a Relationship between Multilevel NACKs and CQI Correcting Offset Values

| NACK State Index | CQI Offset Value |
| --- | --- |
| NACK 0 | 0 |
| NACK 1 | −1 |
| NACK 2 | −3 |
| NACK 3 | −5 |

TABLE 12-continued

Instance of a Relationship between Multilevel NACKs and CQI Correcting Offset Values

| NACK State Index | CQI Offset Value |
| --- | --- |
| NACK 4 | −7 |
| reserved | reserved |
| reserved | reserved |
| reserved | reserved |

When the UE decodes the downlink traffic data and obtains an error result, it is possible that channel quality information indicated by the CQI reported to the base station by the UE is higher than an actual CQI, so the CQI needs to be lowered. Therefore, NACK states denoted as NACK 1 to NACK 4 in Table 12 correspond to negative offset values for correcting the CQI.

The case where the UE decodes the downlink traffic data and obtains an error result is described above. A case where the UE decodes downlink traffic data and obtains a correct result is described below.

When the UE decodes the downlink traffic data and obtains a correct result, the UE sends second information to the base station. The second information includes an ACK instruction. Alternatively, the second information includes an ACK instruction and aperiodic CQI information. Alternatively, the second information includes one ACK state of multiple ACK states, where different ACK states correspond to different CQI information. The base station receives the second information.

To send the downlink traffic data to the UE, the base station may determine an MCS for the downlink traffic data based on the CQI and other information reported by the UE, and the base station may perform modulation and coding on the downlink traffic data according to the selected MCS. After the UE receives the downlink traffic data sent by the base station, the UE may decode the downlink traffic data according to the MCS. When the UE decodes the downlink traffic data and obtains a correct result, the UE feeds back an ACK to the base station. After the base station receives the ACK feedback, it is indicated that transmission of the downlink traffic data is completed. The CQI information may be carried simultaneously when the UE feeds back the ACK instruction to the base station. The base station may schedule a next traffic transmission with reference to the CQI information. In view of this, there are the solutions described below.

Solution 3: when the UE decodes downlink traffic data correctly, only an ACK instruction is fed back without carrying CQI information.

In some embodiments, when the UE feeds back an ACK/NACK to the base station, only the NACK state has a mapping relation with CQI information, while the ACK instruction merely indicates that the downlink traffic data is correctly decoded.

Solution 4: when the UE decodes downlink traffic data correctly, the UE reports aperiodic CQI information to the base station simultaneously when feeding back an ACK instruction to the base station. When the base station schedules a subsequent transmission, the base station determines, according to the CQI information, an MCS and other parameters for scheduling data, so as to meet requirements for the reliability and latency of data transmission.

Solution 5: when the UE decodes downlink traffic data correctly, the UE feeds back one ACK state to the base station. There are multiple ACK states. Different states have a mapping relation with CQI information. After the base station receives the one ACK state, the base station determines, according to CQI information corresponding to the one ACK state, an MCS and other parameters for scheduling a subsequent transmission, so as to meet requirements for the reliability and latency of data transmission.

In some embodiments, different ACK states corresponding to different CQI information in solution 5 includes: different ACK states corresponding to different second offset value information for correcting a CQI previously received by the base station, or different ACK states corresponding to different CQI reporting information. CQI reporting information may be aperiodic CQI reporting information.

In solution 5, the multiple ACK states may be referred to as multilevel ACKs. Each ACK state itself has a certain mapping relation with CQI information. Two mappings are exemplified below.

Mapping 3: each ACK state indicates a CQI offset value (that is, second offset value information for correcting the CQI previously received by the base station). The base station corrects the previously receive CQI based on an offset value corresponding to the one ACK state fed back by the UE.

Mapping 4: each ACK state has a mapping relation with an indexed row in a CQI table. For example, ACK state 2 corresponds to a second row in the CQI table, and receiving ACK state 2 means that a current channel state is a channel state indicated by the second row in the CQI table.

In solution 5, there are multiple ACK states, and each state indicates that the decoding is correct. Each state has a certain mapping relation with CQI information. The CQI information may be the offset value or a row index in the CQI table. After decoding the one ACK state, the base station may acquire the CQI information without decoding the CQI information separately. However, in solution 4, after the ACK instruction and the aperiodic CQI are received, only decoding success information is acquired by decoding the ACK instruction, while the CQI information is acquired by decoding the aperiodic CQI.

In some embodiments, in the case where the second information includes the ACK instruction and the aperiodic CQI information or the second information includes the one ACK state, after the base station receives the second information, the method further includes that: the base station determines, according to the CQI information indicated by the second information, a parameter for scheduling a subsequent transmission.

An example is given below to describe solutions 3, 4 and 5.

For example, a current CQI table is a 16-row table, which needs to be denoted by 4 bits, and different row indexes represent different channel state information.

In an instance corresponding to solution 3, when the UE decodes downlink traffic data and obtains a correct result, only an ACK instruction is fed back without carrying any CQI information.

In an instance corresponding to solution 4, when the UE decodes downlink traffic data and obtains a correct result, the UE reports an aperiodic CQI to the base station while feeding back an ACK instruction to the base station. That is, the UE needs to feed back aperiodic CQI reporting having 4-bit overheads simultaneously while the UE feeds back the ACK instruction.

In an instance where mapping 4 is used in solution 5, when the UE decodes downlink traffic data and obtains a correct result, the UE feeds back one ACK state to the base station. There are 8 ACK states denoted as ACK 0 to ACK 7. The multiple states have a mapping relation with CQI information. The mapping relation is as shown in Table 13 below. CQI 0 to CQI 7 are indexes of 8 rows among 16 rows of a CQI table. The last 8 rows are reserved and may represent different NACK states, which are denoted as "reserved".

TABLE 13

Instance of a Mapping Relation between Multilevel ACKs and CQIs

| ACK State Index | CQI Index |
| --- | --- |
| ACK 0 | CQI 0 |
| ACK 1 | CQI 1 |
| ACK 2 | CQI 2 |
| ACK 3 | CQI 3 |
| ACK 4 | CQI 4 |
| ACK 5 | CQI 5 |
| ACK 6 | CQI 6 |
| ACK 7 | CQI 7 |
| reserved | reserved |
| reserved | reserved |
| reserved | reserved |
| reserved | reserved |
| reserved | reserved |
| reserved | reserved |
| reserved | reserved |
| reserved | reserved |

In an instance where mapping 3 is used in solution 5, when the UE decodes downlink traffic data and obtains a correct result, the UE feeds back an ACK state to the base station. There are 3 ACK states denoted as ACK 0 to ACK 2. Different states indicate different offset values for correcting existing CQI information. A relationship between ACK states and offset values is indicated by a 3-bit table, which is shown by Table 14 below. Reserved states may represent different NACK states, which are denoted as "reserved".

TABLE 14

Instance of a Relationship between Multilevel ACKs and CQI Correcting Offset Values

| ACK State Index | CQI Offset Value |
| --- | --- |
| ACK 0 | 0 |
| ACK 1 | 1 |
| ACK 2 | 3 |
| reserved | reserved |
| reserved | reserved |
| reserved | reserved |
| reserved | reserved |
| reserved | reserved |

When the UE decodes the downlink traffic data and obtains a correct result, it is possible that channel quality information indicated by the CQI reported to the base station by the UE is lower than an actual CQI, so the CQI needs to be raised to improve the utilization rate of resources. Therefore, ACK states denoted as ACK 1 to ACK 2 in Table 14 correspond to positive offset values for correcting the CQI.

In some embodiments, the base station sends downlink traffic data to the UE, and the UE determines to feed back an NACK or ACK according to a decoding result of the downlink traffic data. Feedback solutions for the same downlink traffic data may be free combinations of solution 1 or 2 for NACK and solution 3, 4 or 5 for ACK. That is, when the NACK is fed back for the downlink traffic data, any one of solutions 1 and 2 may be selected; and when the ACK is fed back for the downlink traffic data, any one of solutions 3, 4 and 5 may be selected. A final feedback solution is a combination of the NACK feedback solution and the ACK feedback solution.

A BLER of CQI information in first information and a BLER of CQI information in second information are described below.

In some embodiments, the BLER of the CQI information in the first information and the BLER of the CQI information in the second information are determined according to a BLER of an MCS table used by the base station for sending downlink traffic data. That is, the BLER of the CQI information in the first information and the BLER of the CQI information in the second information are determined according to the following factor: a BLER of the MCS table used by the base station for sending the downlink traffic data.

In some embodiments, the BLER of the CQI information in the first information adopts one BLER in the MCS table, and the BLER of the CQI information in the second information adopts one BLER in the MCS table. A rule for determining the BLER of the CQI information in the first information and the BLER of the CQI information in the second information according to a BLER of the MCS table used by the base station for sending the downlink traffic data includes the following modes: selecting any one BLER from the MCS table, or selecting a BLER in a sequential manner or a reverse sequential manner according to an arrangement sequence in the MCS table.

In some embodiments, the CQI information in the first information uses a CQI table corresponding to the smallest BLER in BLERs of the MCS table, and the CQI information in the second information uses a CQI table corresponding to the largest BLER in the BLERs of the MCS table. That is, in NACK feedback, the strictest BLERn is selected as the BLER for CQI feedback, and in ACK feedback, the loosest BLER1 is selected as the BLER for CQI feedback, where BLER1>BLER2> . . . >BLERn, and n is a positive integer. In case of decoding errorly, it is indicated that the channel condition is poor, and it is necessary to feed back a CQI having a higher reliability for successful decoding. The smaller the BLER of a CQI, the higher the success rate of decoding. Therefore, the smallest BLER is selected.

In some embodiments, determining the BLER of the CQI information in the first information and the BLER of the CQI information in the second information according to a BLER of the MCS table used by the base station for sending the downlink traffic data includes: the BLER of the CQI information in the first information being the same as a BLER of an MCS used by the downlink traffic data, and the BLER of the CQI in the second information being the same as a BLER of an MCS used by the downlink traffic data. That is, the BLER for feeding back the CQI is the same as a BLER of an MCS used by the downlink traffic data.

When the UE feeds back an ACK/NACK to the base station, CQI information in preceding solution 1 or 2 for NACK and CQI information in preceding solution 4 or 5 for ACK may be based on CQI tables of different BLERs. Similarly, MCS tables used by the base station for transmitting downlink traffic data may be based on different BLERs. The BLER may have multiple values. Different BLERs are denoted as BLER1, BLER2, . . . and BLERn, where BLER1>BLER2> . . . >BLERn, and n is a positive integer. A BLER of a CQI table is determined according to the BLER of the MCS used by the base station for transmitting traffic data, and a specific solution is described below.

The UE feeds back an ACK/NACK to the base station, and CQI information related to the ACK/NACK feedback uses a CQI table of BLERi, where $1 \le i \le n$. That is, the BLER of the CQI information in the first information is one BLER in an MCS table, and a BLER of CQI information in second information is one BLER of the MCS table.

In some embodiments, the UE feeds back an ACK to the base station, and CQI information related to the ACK feedback uses a CQI table of BLER1. That is, the CQI information in the second information uses a CQI table corresponding to the largest BLER in BLERs of the MCS table.

In some embodiments, the UE feeds back an NACK to the base station, and CQI information related to the NACK feedback uses a CQI table of BLERn. That is, the CQI information in the first information uses a CQI table corresponding to the smallest BLER in BLERs of the MCS table.

In some embodiments, the BLER of the MCS table used for transmitting downlink traffic data to the UE by the base station is BLERj, the UE feeds back an ACK/NACK to the base station after decoding the downlink traffic data, and CQI information related to the ACK/NACK feedback uses a CQI table of BLERj, where $1 \le j \le n$. That is, the BLER of the CQI information in the first information is the same as a BLER of an MCS used by the downlink traffic data, and the BLER of the CQI information in the second information is the same as a BLER of an MCS used by the downlink traffic data.

An example is given below to describe the preceding solution.

For example, there are two kinds of BLER values for each of a CQI table and an MCS table, where $BLER1=10^{-1}$ and $BLER2=10^{-5}$.

No matter whether an MCS used by the base station for sending downlink traffic data to the UE belongs to an MCS table having a BLER of $10^{-1}$ or an MCS table having a BLER of $10^{-5}$, the UE feeds back an ACK/NACK to the base station after decoding the downlink traffic data, and CQI information related to the ACK/NACK uses a CQI table having a BLER of $10^{-1}$.

Alternatively, no matter whether the MCS used by the base station for sending downlink traffic data to the UE belongs to an MCS table having a BLER of $10^{-1}$ or an MCS table having a BLER of $10^{-5}$, the UE feeds back an ACK/NACK to the base station after decoding the downlink traffic data, and CQI information related to the ACK/NACK uses a CQI table having a BLER of $10^{-5}$.

In some embodiments, no matter whether the MCS used by the base station for sending downlink traffic data to a UE belongs to an MCS table having a BLER of $10^{-1}$ or an MCS table having a BLER of $10^{-5}$, the UE decodes the downlink traffic data correctly and feeds back an ACK to the base station, and CQI information related to the ACK uses a CQI table having a BLER of $10^{-1}$.

In some embodiments, no matter whether the MCS used by the base station for sending downlink traffic data to the UE belongs to an MCS table having a BLER of $10^{-1}$ or an MCS table having a BLER of $10^{-5}$, the UE decodes the downlink traffic data in error and feeds back an NACK to the base station, and CQI information related to the NACK feedback uses a CQI table having a BLER of $10^{-5}$.

If the MCS used by the base station for transmitting downlink traffic data to the UE belongs to an MCS table having a BLER of $10^{-1}$, the UE feeds back an ACK/NACK to the base station after decoding the downlink traffic data, and CQI information related to the ACK/NACK uses a CQI table having a BLER of $10^{-1}$. Similarly, if the MCS used by the base station for transmitting downlink traffic data to the UE belongs to an MCS table having a BLER of $10^{-5}$, the UE feeds back an ACK/NACK to the base station after decoding the downlink traffic data, and CQI information related to the ACK/NACK uses a CQI table having a BLER of $10^{-5}$.

The base station sends downlink traffic data to the UE, and the UE feeds back an NACK or ACK to the base station according to a decoding result. Any one of solutions 1 and 2 may be selected for the NACK feedback. Any one of solutions 3, 4 and 5 may be selected for the ACK feedback. A final feedback solution of downlink traffic data decoding are formed by combining the NACK feedback solution and the ACK feedback solution. In the final feedback solution, the number of bits of NACK feedback may be greater than the number of bits of ACK feedback, and consequently, the UE and the base station may be not uniform in the understanding of the number of feedback bits. This affects the determination of a position where the base station detects feedback information. In view of the fact that ACK feedback information (that is, second information) and NACK feedback information (that is, first information) are not uniform in the number of bits, an embodiment of the present disclosure provides the three solutions described below.

Solution 6: in the case where decoding of downlink traffic data has a correct result and the number of bits of second information is less than the number of bits of first information, before the step of sending the second information to the base station, the method further includes: padding the second information so that the number of bits of the padded second information is equal to the number of bits of the first information.

In some embodiments, the step of padding the second information includes: performing zero-padding on the second information, or repeating a bit of the second information.

That is, when the number of bits of ACK feedback information is less than the number of bits of NACK feedback information, the ACK feedback information is padded, and the number of bits of the padded ACK information fed back to the base station by the UE is the same as the number of bits of the NACK information fed back to the base station by the UE. The padding may be performing zero-padding on the ACK feedback information, or repeating a bit of the ACK feedback information.

Solution 7: second information and first information each have n bits, m states of $2^n$ states have a mapping relation with CQIs, the number of ACK states in the $2^n$ states is denoted as x, the number of NACK states in the $2^n$ states is denoted as y, where $1 \leq m \leq 2^n$, $1 \leq x \leq 2^n$, $1 \leq y \leq 2^n$, x+y=2', and m, n, x and y are each a positive integer.

Solution 7 is applicable to at least the case where both an NACK and an ACK carry CQI information and the case where only an NACK carries CQI information and an ACK carries no CQI information.

Solution 8: the number of bits of second information is denoted as a, and the number of bits of first information is denoted as b, where a and b are each a positive integer; in the case where decoding of downlink traffic data has a correct result, a resource position for the second information is determined based on the number a of bits of the second information and a PUCCH resource indicated by a base station; in the case where decoding of downlink traffic data has an error result, a resource position for the first information is determined based on the number b of bits of the first information and a PUCCH resource indicated by the base station.

That is, solution 8 allows ACK feedback information and NACK feedback information to have different numbers of bits, where the number of bits of the ACK feedback information is a, and the number of bits of the NACK feedback information is b. When the UE feeds back an ACK, resource position #1 used by the feedback is determined based on the number a of information bits and the PUCCH resource indicated by the base station. When the UE feeds back an NACK, resource position #2 used by the feedback is determined based on the number b of information bits and the PUCCH resource indicated by the base station. Here, a may be equal to b, or different from b. When a=b, resource positions #1 and #2 represent the same resource. When a≠b, resource positions #1 and #2 represent different resources.

After the step of receiving the first information sent by the UE and/or receiving the second information sent by the UE, the method further includes that: the base station firstly detects the second information at the resource position for the second information, and then, in the case where no second information is detected at the resource position for the second information, the base station detects the first information at the resource position for the first information. That is, this solution for receiving an ACK/NACK by the base station has a smaller blind detection complexity. For example, in at least 90% detections, the second information can be detected at the resource position of the second information, and there is no need to detect the first information.

An example is given below to describe solutions 6, 7 and 8.

For example, when the UE feeds back an ACK/NACK and a CQI to the base station, only the NACK state carries CQI information, and there are 15 NACK states, where different states represent different CQI information, having 4-bit overheads; the ACK carries no CQI information, and there is only one state, having 1-bit overheads, where the bit field is set to 1 and represents the ACK.

In an instance corresponding to solution 6, the number of bits of ACK feedback information is less than the number of bits of NACK feedback information. The ACK feedback is padded, and the number of bits of the padded ACK feedback is the same as the number of bits of the NACK feedback. If zero-padding is performed on the ACK feedback, state 1000 denotes that the decoding state is an ACK. If the bit of the ACK is repeated to pad the ACK feedback, state 1111 denotes that the decoding state is the ACK. In this case, the ACK uses 4 bits and occupies one state of 16 states, and an NACK occupies the remaining 15 states.

In an instance corresponding to solution 7, ACK/NACK feedback information has 4 bits. 15 states of 16 states have a mapping relation with CQIs. One state of the 16 states denotes that the feedback information is an ACK, and the remaining 15 states denote NACKs. An ACK/NACK feedback solution is represented by a 4-bit table. As shown in Table 15 below, 15 NACK states are denoted as NACK 0 to NACK 14, and each NACK state has a direct mapping relation with CQI information. CQI 0 to CQI 14 denote 15 row indexes in a 16-row CQI table. An ACK state which does not carry CQI information is represented as ACK 15, which is denoted as "reserved".

TABLE 15

Instance of a Mapping Relation between Multilevel NACKs and CQIs

| NACK State Index | CQI Index |
|---|---|
| NACK 0 | CQI 0 |
| NACK 1 | CQI 1 |

TABLE 15-continued

Instance of a Mapping Relation between
Multilevel NACKs and CQIs

| NACK State Index | CQI Index |
|---|---|
| NACK 2 | CQI 2 |
| NACK 3 | CQI 3 |
| NACK 4 | CQI 4 |
| NACK 5 | CQI 5 |
| NACK 6 | CQI 6 |
| NACK 7 | CQI 7 |
| NACK 8 | CQI 8 |
| NACK 9 | CQI 9 |
| NACK 10 | CQI 10 |
| NACK 11 | CQI 11 |
| NACK 12 | CQI 12 |
| NACK 13 | CQI 13 |
| NACK 14 | CQI 14 |
| ACK 15 | reserved |

In an instance corresponding to solution 8, ACK feedback has 1-bit overhead, and NACK feedback has 4-bit overheads. Resource position #1 used by the ACK feedback is determined based on the 1-bit overhead and a PUCCH resource indicated by the base station. Resource position #2 used by the NACK feedback is determined based on the 4-bit overheads and a PUCCH resource indicated by the base station.

According to the CQI feedback enhancement method provided by the embodiment of the present disclosure, in some implementation processes, the CQI reporting has not only smaller resource overheads but also low latency, implementing reliable CQI reporting and meeting strict requirements set in some scenarios for the reliability and low latency of data transmission.

Embodiment Four

Figure 4:
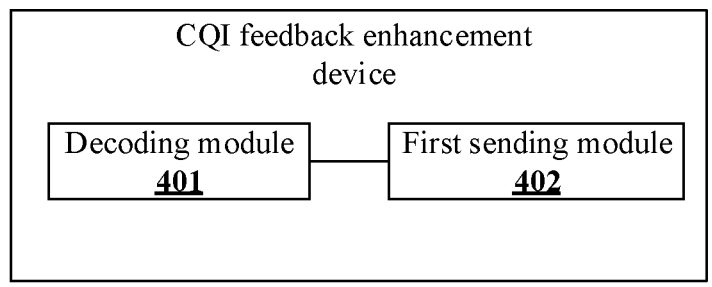
FIG. 4 is a schematic structural diagram of a CQI feedback enhancement device according to embodiment four of the present disclosure.

To solve the problem of large resource overheads and/or high latency in CQI reporting, a CQI feedback enhancement device is provided according to an embodiment of the present disclosure. Referring to FIG. 4, the device includes a decoding module 401 and a first sending module 402.

The decoding module 401 is configured to decode downlink traffic data upon receiving the downlink traffic data sent by a base station.

The first sending module 402 is configured to send first information to the base station in a case where an error result is obtained by decoding the downlink traffic data. The first information includes an NACK instruction and aperiodic CQI information. Alternatively, the first information includes one NACK state of multiple NACK states, where different NACK states correspond to different CQIs.

After the base station receives the first information, the base station determines, according to the CQI information indicated by the first information, a parameter of a retransmission data packet, and sends the retransmission data packet to the CQI feedback enhancement device according to the determined parameter, so as to meet requirements for the reliability and latency of data transmission.

To transmit the downlink traffic data to the CQI feedback enhancement device, the base station may determine an MCS for the downlink traffic data based on the CQI and other information reported by the first sending module 402. The base station may perform modulation and coding on the downlink traffic data according to the selected MCS. After the CQI feedback enhancement device receives the downlink traffic data transmitted by the base station, the CQI feedback enhancement device may decode the downlink traffic data according to the MCS. If If the decoding module 401 decodes the downlink traffic data and obtains an error result, the first sending module 402 sends an NACK to the base station. After receiving the NACK information, the base station sends the retransmission data packet to the CQI feedback enhancement device. One reason for obtaining the error result by decoding the downlink traffic data by the decoding module 401 is that: the CQI reporting information the base station refers to when the base station determines the MCS for the downlink traffic data cannot accurately reflect a CQI during downlink traffic data transmission. In view of this, there are solutions described below.

Solution 1: when the decoding module 401 decodes the downlink traffic data and obtains an error result, the first sending module 402 reports aperiodic CQI information to the base station while sending an NACK instruction to the base station; after the base station receives the NACK instruction and the CQI information, the base station determines, according to the CQI information, an MCS and other parameters of a retransmission data packet, so as to meet requirements for the reliability and latency of data transmission.

In the related art, for aperiodic CQI reporting, the base station needs to send control information to trigger a UE to perform reporting. The process includes: the control information is sent to the UE, the UE receives the control information, and sends an aperiodic CQI to the base station after measurement. In this way, the reported CQI approximates to a CQI during traffic data transmission, but aperiodic CQI reporting has complicated process and high latency, so the CQI reporting may fail to reach a traffic latency target. However, in solution 1 provided by the embodiment of the present disclosure, after obtaining the error result by decoding the downlink traffic data by the decoding module 401, the first sending module 402 sends simultaneously the NACK instruction and the aperiodic CQI to the base station, leading to simpler process and lower latency, and the reported CQI information may be directly used when the data packet is retransmitted.

Solution 2: when the decoding module 401 decodes downlink traffic data and obtains an error result, the first sending module 402 sends one NACK state to the base station. There are multiple NACK states. Different NACK states have a mapping relation with CQI information. That is, different NACK states correspond to different CQI information. After the base station receives the NACKNACK, the base station determines, according to CQI information corresponding to different NACK states, an MCS and other parameters of a retransmission data packet, so as to meet requirements for the reliability and latency of data packet transmission.

In some embodiments, different NACK states corresponding to different CQI information in solution 2 includes: different NACK states corresponding to different first offset value information for correcting a CQI previously received by the base station, or different NACK states corresponding to different CQI reporting information. Here, the previously received CQI may be a proximate CQI previously received, or any CQI previously received; the same applies below.

In solution 2, the multiple NACK states may be referred to as multilevel NACKs. Each NACK state itself has a certain mapping relation with CQI information. Two mappings are exemplified below.

Mapping 1: each NACK state indicates a CQI offset value (that is, first offset value information for correcting the CQI previously received by the base station). The base station corrects the previously received CQI based on an offset value corresponding to the one NACK state fed back by the UE.

Mapping 2: each NACK state has a mapping relation with an indexed row in a CQI table. For example, NACK state 2 corresponds to a second row in the CQI table, and receiving NACK state 2 means that a current channel state is a channel state indicated by the second row in the CQI table.

In solution 2, there are multiple NACK states, and each state indicates that an error is obtained by decoding. Each state has a certain mapping relation with CQI information. The CQI information may be the offset value or a row index in the CQI table. After the base station decodes the one NACK state, the base station may acquire the CQI information without decoding the CQI information separately. However, in solution 1, after the NACK instruction and the aperiodic CQI are received, only decoding error information is acquired by decoding the NACK instruction, while the CQI information is acquired by decoding the aperiodic CQI.

In solution 2, the first information (that is, the one NACK state of the multiple NACK states) sent to the base station by the first sending module 402 may have 2 bits, 3 bits, 4 bits, 5 bits or the like, which is not limited in the embodiment. A description is given below using an example where the one NACK state has 4 bits. The one NACK state sent to the base station by the first sending module 402 may be denoted in binary format. For example, 0000 denotes that the one NACK state is NACK0, and 0001 denotes that the one NACK state is NACK1. However, in solution 1, when the UE decodes the downlink traffic data and obtains an error result, the NACK instruction sent to the base station by the first sending module 402 only has one state. For ease of understanding, an example is given below to describe the case where the NACK instruction only has one state. For example, when the decoding of the downlink traffic data has a correct result, the first sending module 402 sends an ACK denoted as 1 to the base station; and when the decoding of the downlink traffic data has an error result, the first sending module 402 sends an NACK denoted as 0 to the base station. In this case, each of the ACK and the NACK has only one state.

An example is given below to describe solutions 1 and 2.

For example, a current CQI table is a 16-row table, which needs to be denoted by 4 bits, and different row indexes represent different channel state information.

In an instance corresponding to solution 1, when the decoding module 401 decodes downlink traffic data and obtains an error result, the first sending module 402 reports an aperiodic CQI to the base station while feeding back an NACK instruction to the base station. That is, the first sending module 402 needs to feed back aperiodic CQI reporting having 4-bit overheads simultaneously when the first sending module 402 feeds back the NACK instruction.

In an instance where mapping 2 is used in solution 2, when the decoding module 401 decodes downlink traffic data and obtains an error result, the first sending module 402 feeds back one NACK state to the base station. There are 15 NACK states denoted as NACK 0 to NACK 14. The multiple states have a direct mapping relation with CQI information. The mapping relation is represented by a 4-bit table. As shown in Table 16 below, CQI 0 to CQI 14 are indexes of 15 rows among 16 rows of a CQI table, and the last row is reserved and may represent an ACK state which does not carry CQI information, which is denoted as "reserved".

TABLE 16

Instance of a Mapping Relation between Multilevel NACKs and CQIs

| NACK State Index | CQI Index |
| --- | --- |
| NACK 0 | CQI 0 |
| NACK 1 | CQI 1 |
| NACK 2 | CQI 2 |
| NACK 3 | CQI 3 |
| NACK 4 | CQI 4 |
| NACK 5 | CQI 5 |
| NACK 6 | CQI 6 |
| NACK 7 | CQI 7 |
| NACK 8 | CQI 8 |
| NACK 9 | CQI 9 |
| NACK 10 | CQI 10 |
| NACK 11 | CQI 11 |
| NACK 12 | CQI 12 |
| NACK 13 | CQI 13 |
| NACK 14 | CQI 14 |
| reserved | reserved |

In an instance where mapping 1 is used in solution 2, when the decoding module 401 decodes downlink traffic data and obtains an error result, the first sending module 402 feeds back an NACK state to the base station. There are 5 NACK states denoted as NACK 0 to NACK 4. Different states represent different offset values for correcting CQI information previously received. A relationship between NACK states and offset values is represented by a 3-bit table, which is shown by Table 17 below. Reserved states may represent different ACK states, which are denoted as "reserved".

TABLE 17

Instance of a Relationship between Multilevel NACKs and CQI Correcting Offset Values

| NACK State Index | CQI Offset Value |
| --- | --- |
| NACK 0 | 0 |
| NACK 1 | −1 |
| NACK 2 | −3 |
| NACK 3 | −5 |
| NACK 4 | −7 |
| reserved | reserved |
| reserved | reserved |
| reserved | reserved |

When the UE decodes the downlink traffic data and obtains an error result, it is possible that channel quality information indicated by the CQI reported to the base station is higher than an actual CQI, so the CQI needs to be lowered. Therefore, NACK states denoted as NACK 1 to NACK 4 in Table 17 correspond to negative offset values for correcting the CQI.

The case where the decoding module 401 decodes the downlink traffic data and obtains an error result is described above. A case where the decoding module 401 decodes downlink traffic data and obtains a correct result is described below.

When the decoding module 401 decodes the downlink traffic data and obtains a correct result, the first sending module 402 sends second information to the base station. The second information includes an ACK instruction. Alternatively, the second information includes an ACK instruction and aperiodic CQI information. Alternatively, the second information includes one ACK state of multiple ACK states, where different ACK states correspond to different CQI information. The base station receives the second information.

To send the downlink traffic data to the CQI feedback enhancement device, the base station may determine an MCS for the downlink traffic data based on the CQI and other information reported by the first sending module 402. The base station may perform modulation and coding on the downlink traffic data according to the selected MCS. After the CQI feedback enhancement device receives the downlink traffic data sent by the base station, the CQI feedback enhancement device may decode the downlink traffic data according to the MCS. When the decoding module 401 decodes the downlink traffic data and obtains a correct result, the first sending module 402 feeds back the ACK to the base station. After receiving the ACK feedback, it is indicated that transmission of the downlink traffic data is completed. The CQI information may be carried simultaneously while the first sending module 402 feeds back the ACK instruction to the base station. The base station may schedule a next traffic transmission with reference to the CQI information. In view of this, there are the solutions described below.

Solution 3: when the decoding module 401 decodes downlink traffic data correctly, the first sending module 402 feeds back only an ACK instruction without carrying CQI information.

In some embodiments, when the first sending module 402 feeds back an ACK/NACK to the base station, only the NACK state has a mapping relation with CQI information, while the ACK instruction merely indicates that the downlink traffic data is correctly decoded.

Solution 4: when the decoding module 401 decodes downlink traffic data correctly, the first sending module 402 reports aperiodic CQI information to the base station simultaneously when feeding back an ACK instruction to the base station. When the base station schedules a subsequent transmission, the base station determines, according to the CQI information, an MCS and other parameters for scheduling data, so as to meet requirements for the reliability and latency of data transmission.

Solution 5: when the decoding module 401 decodes downlink traffic data correctly, the first sending module 402 feeds back one ACK state to the base station. There are multiple ACK states. Different states have a mapping relation with CQI information. After the base station receives the one ACK state, the base station determines, according to CQI information corresponding to the one ACK state, an MCS and other parameters for scheduling a subsequent transmission, so as to meet requirements for the reliability and latency of data transmission.

In some embodiments, different ACK states corresponding to different CQI information in solution 5 includes: different ACK states corresponding to different second offset value information for correcting a CQI previously received by the base station, or different ACK states corresponding to different CQI reporting information. CQI reporting information may be aperiodic CQI reporting information.

In solution 5, the multiple ACK states may be referred to as multilevel ACKs. Each ACK state itself has a certain mapping relation with CQI information. Two mappings are exemplified below.

Mapping 3: each ACK state indicates a CQI offset value (that is, second offset value information for correcting the CQI previously received the base station). The base station corrects the previously receive CQI based on an offset value corresponding to the one ACK state fed back by the UE.

Mapping 4: each ACK state has a mapping relation with an indexed row in a CQI table. For example, ACK state 2 corresponds to a second row in the CQI table, and receiving ACK state 2 means that a current channel state is a channel state indicated by the second row in the CQI table.

In solution 5, there are multiple ACK states, and each state indicates that the decoding is correct. Each state has a certain mapping relation with CQI information. The CQI information may be the offset value or a row index in the CQI table. After decoding the one ACK state, the base station may acquire the CQI information without decoding the CQI information separately. However, in solution 4, after the ACK instruction and the aperiodic CQI are received, only decoding success information is acquired by decoding the ACK instruction, while the CQI information is acquired by decoding the aperiodic CQI.

In some embodiments, in the case where the second information includes the ACK instruction and the aperiodic CQI information or the second information includes the one ACK state, after the base station receives the second information, the method further includes that: the base station determines, according to the CQI information indicated by the second information, a parameter for scheduling a subsequent transmission.

An example is given below to describe solutions 3, 4 and 5.

For example, a current CQI table is a 16-row table, which needs to be denoted by 4 bits, and different row indexes represent different channel state information.

In an instance corresponding to solution 3, when the decoding module 401 decodes downlink traffic data and obtains a correct result, the first sending module 402 feeds back only an ACK instruction without carrying any CQI information.

In an instance corresponding to solution 4, when the decoding module 401 decodes downlink traffic data and obtains a correct result, the first sending module 402 reports an aperiodic CQI to the base station while feeding back an ACK instruction to the base station. That is, the UE needs to feed back aperiodic CQI reporting having 4-bit overheads simultaneously while the UE feeds back the ACK instruction.

In an instance where mapping 4 is used in solution 5, when the decoding module 401 decodes downlink traffic data and obtains a correct result, the first sending module 402 feeds back one ACK state to the base station. There are 8 ACK states denoted as ACK 0 to ACK 7. The multiple states have a mapping relation with CQI information. The mapping relation is as shown in Table 18 below. CQI 0 to CQI 7 are indexes of 8 rows among 16 rows of a CQI table. The last 8 rows are reserved and represent different NACK states, which are denoted as "reserved".

TABLE 18

Instance of a Mapping Relation between Multilevel ACKs and CQIs

| ACK State Index | CQI Index |
|---|---|
| ACK 0 | CQI 0 |
| ACK 1 | CQI 1 |
| ACK 2 | CQI 2 |
| ACK 3 | CQI 3 |
| ACK 4 | CQI 4 |
| ACK 5 | CQI 5 |
| ACK 6 | CQI 6 |
| ACK 7 | CQI 7 |
| reserved | reserved |
| reserved | reserved |
| reserved | reserved |
| reserved | reserved |

TABLE 18-continued

Instance of a Mapping Relation between
Multilevel ACKs and CQIs

| ACK State Index | CQI Index |
|---|---|
| reserved | reserved |
| reserved | reserved |
| reserved | reserved |
| reserved | reserved |

In an instance where mapping 3 is used in solution 5, when the decoding module 401 decodes downlink traffic data and obtains a correct result, the first sending module 402 feeds back an ACK state to the base station. There are 3 ACK states denoted as ACK 0 to ACK 2. Different states represent different offset values for correcting existing CQI information. A relationship between NACK states and offset values is represented by a 3-bit table, which is shown by Table 19 below. Reserved states may represent different NACK states, which are denoted as "reserved".

TABLE 19

Instance of a Relationship between Multilevel
ACKs and CQI Correcting Offset Values

| ACK State Index | CQI Offset Value |
|---|---|
| ACK 0 | 0 |
| ACK 1 | 1 |
| ACK 2 | 3 |
| reserved | reserved |
| reserved | reserved |
| reserved | reserved |
| reserved | reserved |
| reserved | reserved |

When the decoding module 401 decodes the downlink traffic data and obtains a correct result, it is possible that channel quality information indicated by the CQI reported to the base station by the first sending module 402 is lower than an actual CQI, so the CQI needs to be raised to improve the utilization rate of resources. Therefore, ACK states denoted as ACK 1 to ACK 2 in Table 19 correspond to positive offset values for correcting the CQI.

In some embodiments, the base station sends downlink traffic data to the CQI feedback enhancement device, and the decoding module 401 determines to feed back an NACK or ACK according to a decoding result of the downlink traffic data. Feedback solutions for the same downlink traffic data may be free combinations of solution 1 or 2 for NACK and solution 3, 4 or 5 for ACK. That is, when the NACK is fed back for the downlink traffic data, any one of solutions 1 and 2 may be selected; and when the ACK is fed back for the downlink traffic data, any one of solutions 3, 4 and 5 may be selected. A final feedback solution is a combination of the NACK feedback solution and the ACK feedback solution.

A BLER of CQI information in first information and a BLER of CQI information in second information are described below.

In some embodiments, the BLER of the CQI information in the first information and the BLER of the CQI information in the second information are determined according to a BLER of an MCS table used by the base station for sending downlink traffic data. That is, the BLER of the CQI information in the first information and the BLER of the CQI information in the second information are determined according to the following factor: a BLER of the MCS table used by the base station for sending the downlink traffic data.

In some embodiments, the BLER of the CQI information in the first information adopts one BLER in the MCS table, and the BLER of the CQI information in the second information adopts one BLER in the MCS table. A rule for determining the BLER of the CQI information in the first information and the BLER of the CQI information in the second information according to a BLER of the MCS table used by the base station for sending the downlink traffic data includes the following modes: selecting any one BLER from the MCS table, or selecting a BLER in a sequential manner or a reverse sequential manner according to an arrangement sequence in the MCS table.

In some embodiments, the CQI information in the first information uses a CQI table corresponding to the smallest BLER in BLERs of the MCS table, and the CQI information in the second information uses a CQI table corresponding to the largest BLER in the BLERs of the MCS table. That is, in NACK feedback, the strictest BLERn is selected as the BLER for CQI feedback, and in ACK feedback, the loosest BLER1 is selected as the BLER for CQI feedback, where BLER1>BLER2> . . . >BLERn, and n is a positive integer. In case of decoding errorly, it is indicated that the channel condition is poor and it is necessary to feed back a CQI having a higher reliability for successful decoding. The smaller the BLER of a CQI, the higher the success rate of the decoding. Therefore, the smallest BLER is selected.

In some embodiments, determining the BLER of the CQI information in the first information and the BLER of the CQI information in the second information according to a BLER of the MCS table used by the base station for sending the downlink traffic data includes: the BLER of the CQI information in the first information being the same as a BLER of an MCS used by the downlink traffic data, and the BLER of the CQI in the second information being the same as a BLER of an MCS used by the downlink traffic data. That is, the BLER for feeding back the CQI is the same as a BLER of an MCS used by downlink traffic data.

When the first sending module 402 feeds back an ACK/NACK to the base station, CQI information in preceding solution 1 or 2 for NACK and CQI information in preceding solution 4 or 5 for ACK may be based on CQI tables of different BLERs. Similarly, MCS tables used by the base station for transmitting downlink traffic data may be based on different BLERs. The BLER may have multiple values. Different BLERs are denoted as BLER1, BLER2, . . . and BLERn, where BLER1>BLER2> . . . >BLERn, and n is a positive integer. A BLER of a CQI table is determined according to the BLER of the MCS used by the base station for transmitting traffic data, and a specific solution is described below.

The first sending module 402 feeds back an ACK/NACK to the base station, and CQI information related to the ACK/NACK feedback uses a CQI table of BLERi, where 1≤i≤n. That is, a BLER of CQI information in first information is one BLER in an MCS table, and a BLER of CQI information in second information is one BLER of the MCS table.

In some embodiments, the first sending module 402 feeds back an ACK to the base station, and CQI information related to the ACK feedback uses a CQI table of BLER1. That is, the CQI information in the second information uses a CQI table corresponding to the largest BLER in BLERs of an MCS table.

In some embodiments, the first sending module 402 feeds back an NACK to the base station, and CQI information related to the NACK feedback uses a CQI table of BLERn. That is, CQI information in the first information uses a CQI table corresponding to the smallest BLER in the BLERs of an MCS table.

In some embodiments, a BLER of the MCS table used for transmitting downlink traffic data to the CQI feedback enhancement device by the base station is BLERj, the decoding module 401 feeds back an ACK/NACK to the base station after the first sending module 402 decodes the downlink traffic data, and CQI information related to the ACK/NACK feedback uses a CQI table of BLERj, where $1 \leq j \leq n$. That is, the BLER of the CQI information in the first information is the same as a BLER of an MCS used by the downlink traffic data, and the BLER of the CQI information in the second information is the same as a BLER of an MCS used by the downlink traffic data.

An example is given below to describe the preceding solution.

For example, there are two BLER values for each of a CQI table and an MCS table, where $BLER1=10^{-1}$ and $BLER2=10^{-5}$.

No matter whether an MCS used by the base station for sending downlink traffic data to the CQI feedback enhancement device belongs to an MCS table having a BLER of $10^{-1}$ or an MCS table having a BLER of $10^{-5}$, the first sending module 402 feeds back an ACK/NACK to the base station after the decoding module 401 decodes the downlink traffic data, and CQI information related to the ACK/NACK uses a CQI table having a BLER of $10^{-1}$.

Alternatively, whether the MCS used by the base station for sending downlink traffic data to the CQI feedback enhancement device belongs to an MCS table having a BLER of $10^{-1}$ or an MCS table having a BLER of $10^{-5}$, the first sending module 402 feeds back an ACK/NACK to the base station after the decoding module 401 decodes the downlink traffic data, and CQI information related to the ACK/NACK uses a CQI table having a BLER of $10^{-5}$.

In some embodiments, no matter whether the MCS used by the base station for sending downlink traffic data to the CQI feedback enhancement device belongs to an MCS table having a BLER of $10^{-1}$ or an MCS table having a BLER of $10^{-5}$, the decoding module 401 decodes the downlink traffic data correctly, and the first sending module 402 feeds back an ACK to the base station. CQI information related to the ACK uses a CQI table having a BLER of $10^{-1}$.

In some embodiments, no matter whether the MCS used for by the base station sending downlink traffic data to the CQI feedback enhancement device belongs to an MCS table having a BLER of $10^{-1}$ or an MCS table having a BLER of $10^{-5}$, the decoding module 401 decodes the downlink traffic data in error, and the first sending module 402 feeds back an NACK to the base station. CQI information related to the NACK feedback uses a CQI table having a BLER of $10^{-5}$.

If the MCS used by the base station for transmitting downlink traffic data to the CQI feedback enhancement device belongs to an MCS table having a BLER of $10^{-1}$, the decoding module 401 decodes the downlink traffic data, the first sending module 402 feeds back an ACK/NACK to the base station, and CQI information related to the ACK/NACK uses a CQI table having a BLER of $10^{-1}$. Similarly, if the MCS used by the base station for transmitting downlink traffic data to the CQI feedback enhancement device belongs to an MCS table having a BLER of $10^{-5}$, the decoding module 401 decodes the downlink traffic data, the first sending module 402 feeds back an ACK/NACK to the base station, and CQI information related to the ACK/NACK uses a CQI table having a BLER of $10^{-5}$.

The base station sends downlink traffic data to the CQI feedback enhancement device, and the first sending module 402 feeds back an NACK or ACK to the base station according to a decoding result. Any one of solutions 1 and 2 may be selected for NACK feedback. Any one of solutions 3, 4 and 5 may be selected for ACK feedback. A final feedback solution of downlink traffic data decoding is formed by combining the NACK feedback solution and the ACK feedback solution. In the final feedback solution, the number of bits of NACK feedback may be greater than the number of bits of ACK feedback, and consequently, the CQI feedback enhancement device and the base station may be not uniform in the understanding of the number of feedback bits. This affects the determination of a position where the base station detects feedback information. In view of the fact that ACK feedback information (that is, second information) and NACK feedback information (that is, first information) are not uniform in the number of bits, an embodiment of the present disclosure provides the three solutions described below.

Solution 6: in the case where decoding of downlink traffic data has a correct result and the number of bits of second information is less than the number of bits of first information, before the step of sending the second information to the base station, the method further includes: padding the second information so that the number of bits of the padded second information is equal to the number of bits of the first information.

In some embodiments, the step of padding the second information includes: performing zero-padding on the second information, or repeating a bit of the second information.

That is, when the number of bits of ACK feedback information is less than the number of bits of NACK feedback information, the ACK feedback information is padded, and the number of bits of the padded ACK information fed back to the base station by the first sending module 402 is the same as the number of bits of the NACK information fed back to the base station by the first sending module 402. The padding may be performing zero-padding on the ACK feedback information, or repeating a bit of the ACK feedback information.

Solution 7: second information and first information each have n bits, m states of $2^n$ states have a mapping relation with CQIs, the number of ACK states in the $2^n$ states is denoted as x, the number of NACK states in the $2^n$ states is denoted as y, where $1 \leq m \leq 2^n$, $1 \leq x \leq 2^n$, $1 \leq y \leq 2^n$, $x+y=2^n$, and m, n, x and y are each a positive integer.

Solution 7 is applicable to at least the case where both an NACK and an ACK carry CQI information and the case where only an NACK carries CQI information and an ACK carries no CQI information.

Solution 8: the number of bits of second information is denoted as a, and the number of bits of first information is denoted as b, where a and b are each a positive integer; in the case where decoding of downlink traffic data has a correct result, a resource position for the second information is determined based on the number a of bits of the second information and a PUCCH resource indicated by the base station; in the case where decoding of downlink traffic data has an error result, a resource position for the first information is determined based on the number b of bits of the first information and a PUCCH resource indicated by the base station.

That is, solution 8 allows ACK feedback information and NACK feedback information to have different numbers of bits, where the number of bits of the ACK feedback information is a, and the number of bits of the NACK feedback information is b. When the first sending module 402 feeds back an ACK, resource position #1 used by the feedback is determined based on the number a of information bits and the PUCCH resource indicated by the base station. When the UE feeds back an NACK, resource position #2 used by the feedback is determined based on the number b of information bits and the PUCCH resource indicated by the base station. Here, a may be equal to b, or different from b. When a=b, resource positions #1 and #2 represent the same resource. When a≠b, resource positions #1 and #2 represent different resources.

After the base station receives the first information sent by the first sending module 402 and/or the base station receives the second information sent by the first sending module 402, the method further includes that: the base station firstly detects the second information at the resource position for the second information, and then, in the case where no second information is detected at the resource position for the second information, the base station detects the first information at the resource position for the first information. That is, this solution for receiving an ACK/NACK by the base station has a smaller blind detection complexity. For example, in at least 90% detections, the second information can be detected at the resource position of the second information, and there is no need to detect the first information.

An example is given below to describe solutions 6, 7 and 8.

For example, when the first sending module 402 feeds back an ACK/NACK and a CQI to the base station, only the NACK state carries CQI information, and there are 15 NACK states, where different states represent different CQI information, having 4-bit overheads; and the ACK carries no CQI information, and there is only one state, having 1-bit overhead, where the bit field is set to 1 and represents the ACK.

In an instance corresponding to solution 6, the number of bits of ACK feedback information is less than the number of bits of NACK feedback information. The ACK feedback is padded, and the number of bits of the padded ACK feedback is the same as the number of bits of the NACK feedback. If zero-padding is performed on the ACK feedback, state 1000 denotes that the decoding state is the ACK. If the bit of the ACK is repeated to pad the ACK feedback, state 1111 denotes that the decoding state is the ACK. In this case, the ACK uses 4 bits and occupies one state of 16 states, and an NACK occupies the remaining 15 states.

In an instance corresponding to solution 7, ACK/NACK feedback information has 4 bits. 15 states of 16 states have a mapping relation with CQIs. One state of the 16 states denotes that the feedback information is an ACK, and the remaining 15 states denote NACKs. An ACK/NACK feedback solution is represented by a 4-bit table. As shown in Table 20 below, 15 NACK states are denoted as NACK 0 to NACK 14, and each NACK state has a direct mapping relation with CQI information. CQI 0 to CQI 14 denote 15 row indexes in a 16-row CQI table. An ACK state, which does not carry CQI information, is represented as ACK 15, which is denoted as "reserved".

TABLE 20

Instance of a Mapping Relation between Multilevel NACKs and CQIs

| NACK State Index | CQI Index |
| --- | --- |
| NACK 0 | CQI 0 |
| NACK 1 | CQI 1 |
| NACK 2 | CQI 2 |
| NACK 3 | CQI 3 |
| NACK 4 | CQI 4 |
| NACK 5 | CQI 5 |
| NACK 6 | CQI 6 |
| NACK 7 | CQI 7 |
| NACK 8 | CQI 8 |
| NACK 9 | CQI 9 |
| NACK 10 | CQI 10 |
| NACK 11 | CQI 11 |
| NACK 12 | CQI 12 |
| NACK 13 | CQI 13 |
| NACK 14 | CQI 14 |
| ACK 15 | reserved |

In an instance corresponding to solution 8, ACK feedback has 1-bit overhead, and NACK feedback has 4-bit overheads. Resource position #1 used by the ACK feedback is determined based on the 1-bit overhead and a PUCCH resource indicated by the base station. Resource position #2 used by the NACK feedback is determined based on the 4-bit overheads and a PUCCH resource indicated by the base station.

According to the CQI feedback enhancement device provided by the embodiment of the present disclosure, in some implementation processes, the CQI reporting has not only smaller resource overheads but also low latency, implementing reliable CQI reporting and meeting strict requirements set in some scenarios for the reliability and low latency of data transmission.

Embodiment Five

Figure 5:
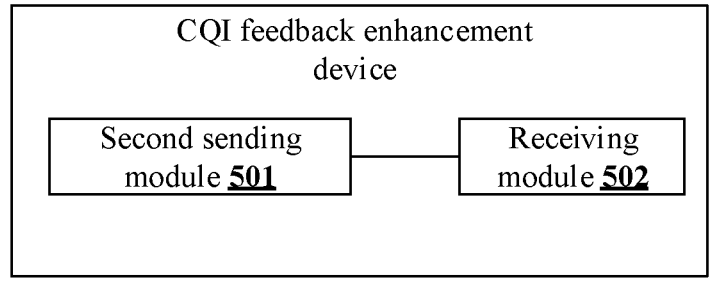
FIG. 5 is a schematic structural diagram of a CQI feedback enhancement device according to embodiment five of the present disclosure.

To solve the problem of large resource overheads and/or high latency in CQI reporting, a CQI feedback enhancement device is provided according to an embodiment of the present disclosure. Referring to FIG. 5, the device includes a second sending module 501 and a receiving module 502.

The second sending module 501 is configured to send downlink traffic data to a UE.

The receiving module 502 is configured to receive first information sent by the UE in a case where an error result is obtained by decoding the downlink traffic data. The first information includes an NACK instruction and aperiodic CQI information. Alternatively, the first information includes one NACK state of multiple NACK states, where different NACK states correspond to different CQI information.

After the receiving module 52 receives the first information, the CQI feedback enhancement device determines, according to the CQI information indicated by the first information, a parameter of a retransmission data packet, and a second sending module 501 sends the retransmission data packet to the UE according to the determined parameter, so as to meet requirements for the reliability and latency of data transmission.

When the second sending module 502 sends the downlink traffic data to the UE, the second sending module 502 may determine an MCS for the downlink traffic data based on the CQI and other information reported by the UE, and may perform modulation and coding on the downlink traffic data according to the selected MCS. After the UE receives the downlink traffic data sent by the second sending module 501, the UE may decode downlink traffic data according to the MCS. If the UE decodes the downlink traffic data and obtains an error result, the UE sends an NACK to the receiving module 502. After the receiving module 502 receives the NACK information, the second sending module 501 sends the retransmission data packet to the UE. One reason for obtaining the error result by decoding the downlink traffic data by the UE is that: the CQI reporting information the CQI feedback enhancement device refers to when the CQI feedback enhancement device determines the MCS for the downlink traffic data cannot accurately reflect a CQI during downlink traffic data transmission. In view of this, there are solutions described below.

Solution 1: when the UE decodes the downlink traffic data and obtains an error result, the UE reports aperiodic CQI information to the receiving module 502 while sending an NACK instruction to the receiving module 502. After the receiving module 502 receives the NACK instruction and the CQI information, an MCS and other parameters of a retransmission data packet to be sent by the second sending module 501 are determined according to the CQI information, so as to meet requirements for the reliability and latency of data transmission.

In the related art, for aperiodic CQI reporting, the base station needs to send control information to trigger the UE to perform reporting. The process includes: the control information is sent to the UE, the UE receives the control information, and sends an aperiodic CQI to the base station after measurement. In this way, the reported CQI approximates to a CQI during traffic data transmission, but aperiodic CQI reporting has complicated process and high latency, so the CQI reporting may fail to reach a traffic latency target. However, in solution 1 provided by the embodiment of the present disclosure, after obtaining the error result by decoding the downlink traffic data by the UE, the NACK instruction and the aperiodic CQI are simultaneously reported to the receiving module 502, leading to simpler process and lower latency, and the reported CQI information may be directly used when the second sending module 501 retransmits the data packet.

Solution 2: when the UE decodes the downlink traffic data and obtains an error result, the UE sends one NACK state to the receiving module 502. There are multiple NACK states. Different NACK states have a mapping relation with CQI information. That is, different NACK states correspond to different CQI information. After the receiving module 502 receives the one NACK state, an MCS and other parameters of a retransmission data packet to be sent by the second sending module 501 are determined according to CQI information corresponding to the one NACK state, so as to meet requirements for the reliability and latency of data packet transmission.

In some embodiments, different NACK states corresponding to different CQI information in solution 2 includes: different NACK states corresponding to different first offset value information for correcting a CQI previously received by the receiving module 502, or different NACK states corresponding to different CQI reporting information. Here, the previously received CQI may be a proximate CQI previously received, or any CQI previously received; the same applies below.

In solution 2, the multiple NACK states may be referred to as multilevel NACKs. Each NACK state itself has a certain mapping relation with CQI information. Two mappings are exemplified below.

Mapping 1: each NACK state indicates a CQI offset value (that is, first offset value information for correcting the CQI previously received by the receiving module 502). The CQI feedback enhancement device corrects the previously received CQI based on an offset value corresponding to the one NACK state fed back by the UE.

Mapping 2: each NACK state has a mapping relation with an indexed row in a CQI table. For example, NACK state 2 corresponds to a second row in the CQI table, and receiving NACK state 2 means that a current channel state is a channel state indicated by the second row in the CQI table.

In solution 2, there are multiple NACK states, and each state indicates that an error is obtained by decoding. Each state has a certain mapping relation with CQI information. The CQI information may be the offset value or a row index in the CQI table. After the base station decodes the one NACK state, the base station may acquire the CQI information without decoding the CQI information separately. However, in solution 1, after the NACK instruction and the aperiodic CQI are received, only decoding error information is acquired by decoding the NACK instruction, while the CQI information is acquired by decoding the aperiodic CQI.

In solution 2, the first information (that is, the one NACK state of the multiple NACK states) sent to the receiving module 502 by the UE may have 2 bits, 3 bits, 4 bits, 5 bits or the like, which is not limited in the embodiment. A description is given below using an example where the one NACK state has 4 bits. The one NACK state sent to the receiving module 502 by the UE may be denoted in binary format. For example, 0000 denotes that the one NACK state is NACK0, and 0001 denotes that the one NACK state is NACK1. However, in solution 1, when the UE decodes the downlink traffic data and obtains an error result, the NACK instruction sent by the UE to the receiving module 502 only has one state. For ease of understanding, an example is given below to describe the case where the NACK instruction only has one state. For example, when the UE decodes the downlink traffic data and obtains a correct result, the UE sends an ACK denoted as 1 to the receiving module 501; and when the UE decodes the downlink traffic data and obtains an error result, the UE sends an NACK denoted as 0 to the receiving module 501. In this case, each of the ACK and the NACK has only one state.

An example is given below to describe solutions 1 and 2.

For example, a current CQI table is a 16-row table, which needs to be denoted by 4 bits, and different row indexes represent different channel state information.

In an instance corresponding to solution 1, when the UE decodes downlink traffic data and obtains an error result, the UE reports an aperiodic CQI to the receiving module 502 while feeding back an NACK instruction to the receiving module 502. That is, the UE needs to feed back aperiodic CQI reporting having 4-bit overheads simultaneously when the UE feeds back the NACK instruction.

In an instance where mapping 2 is used in solution 2, when the UE decodes downlink traffic data and obtains an error result, the UE feeds back one NACK state to the receiving module 502. There are 15 NACK states denoted as NACK0 to NACK14. The multiple states have a direct mapping relation with CQI information. The mapping relation is represented by a 4-bit table. As shown in Table 21 below, CQI 0 to CQI 14 are indexes of 15 rows among 16 rows of a CQI table, and the last row is reserved and may represent an ACK state which does not carry CQI information, which is denoted as "reserved".

TABLE 21

Instance of a Mapping Relation between
Multilevel NACKs and CQIs

| NACK State Index | CQI Index |
|---|---|
| NACK 0 | CQI 0 |
| NACK 1 | CQI 1 |
| NACK 2 | CQI 2 |
| NACK 3 | CQI 3 |
| NACK 4 | CQI 4 |
| NACK 5 | CQI 5 |
| NACK 6 | CQI 6 |
| NACK 7 | CQI 7 |
| NACK 8 | CQI 8 |
| NACK 9 | CQI 9 |
| NACK 10 | CQI 10 |
| NACK 11 | CQI 11 |
| NACK 12 | CQI 12 |
| NACK 13 | CQI 13 |
| NACK 14 | CQI 14 |
| reserved | reserved |

In an instance where mapping 1 is used in solution 2, when the UE decodes downlink traffic data and obtains an error result, the UE feeds back an NACK to the receiving module 502. There are 5 NACK states denoted as NACK 0 to NACK 4. Different states represent different offset values for correcting CQI information previously received. A relationship between NACK states and offset values is represented by a 3-bit table, which is shown by Table 22 below. Reserved states may represent different ACK states, which are denoted as "reserved".

TABLE 22

Instance of a Relationship between Multilevel
NACKs and CQI Correcting Offset Values

| NACK State Index | CQI Offset Value |
|---|---|
| NACK 0 | 0 |
| NACK 1 | −1 |
| NACK 2 | −3 |
| NACK 3 | −5 |
| NACK 4 | −7 |
| reserved | reserved |
| reserved | reserved |
| reserved | reserved |

When the UE decodes the downlink traffic data and obtains an error result, it is possible that channel quality information indicated by the CQI reported to the receiving module 502 by the UE is higher than an actual CQI, so the CQI needs to be lowered. Therefore, NACK states denoted as NACK 1 to NACK 4 in Table 22 correspond to negative offset values for correcting the CQI.

The case where the UE decodes the downlink traffic data and obtains an error result is described above. A case where the UE decodes downlink traffic data and obtains a correct result is described below.

When the UE decodes the downlink traffic data and obtains a correct result, the UE sends second information to the receiving module 502. The second information includes an ACK instruction. Alternatively, the second information includes an ACK instruction and aperiodic CQI information. Alternatively, the second information includes one ACK state of multiple ACK states, where different ACK states correspond to different CQI information. The receiving module 502 receives the second information.

When the second sending module 501 sends the downlink traffic data to the UE, the second sending module 501 may determine an MCS for the downlink traffic data based on the CQI and other information reported by the UE, and may perform modulation and coding on the downlink traffic data according to the selected MCS. After the UE receives the downlink traffic data sent by the second sending module 501, the UE may decode the downlink traffic data according to the MCS. When tUE decodes the downlink traffic data and obtains a correct result, the UE feeds back an ACK to the receiving module 502. After the receiving module 502 receives the ACK feedback, it is indicated that transmission of the downlink traffic data is completed. The CQI information may be carried simultaneously when the UE feeds back the ACK instruction to the receiving module 502. A next traffic transmission may be scheduled with reference to the CQI information. In view of this, there are the solutions described below.

Solution 3: when the UE decodes downlink traffic data correctly, only an ACK instruction is fed back without carrying CQI information.

In some embodiments, when the UE feeds back an ACK/NACK to the receiving module 502, only the NACK state has a mapping relation with CQI information, while the ACK instruction merely indicates that the downlink traffic data is correctly decoded.

Solution 4: when the UE decodes downlink traffic data correctly, the UE reports aperiodic CQI information to the receiving module 502 simultaneously when feeding back an ACK instruction to the receiving module 502. When the CQI feedback enhancement device schedules a subsequent transmission, the CQI feedback enhancement device determines, according to the CQI information, an MCS and other parameters for scheduling data, so as to meet requirements for the reliability and latency of data transmission.

Solution 5: when the UE decodes downlink traffic data correctly, the UE feeds back one ACK state to the receiving module 502. There are multiple ACK states. Different states have a mapping relation with CQI information. After the receiving module 502 receives the one ACK state, the CQI feedback enhancement device determines, according to CQI information corresponding to the one ACK state, an MCS and other parameters for scheduling a subsequent transmission, so as to meet requirements for the reliability and latency of data transmission.

In some embodiments, different ACK states corresponding to different CQI information in solution 5 includes: different ACK states corresponding to different second offset value information for correcting a CQI previously received by the receiving module 502, or different ACK states corresponding to different CQI reporting information. CQI reporting information may be aperiodic CQI reporting information.

In solution 5, the multiple ACK states may be referred to as multilevel ACKs. Each ACK state itself has a certain mapping relation with CQI information. Two mappings are exemplified below.

Mapping 3: each ACK state indicates a CQI offset value (that is, first offset value information for correcting the CQI previously received by the receiving module 502). The CQI feedback enhancement device corrects the previously received CQI based on an offset value corresponding to the one NACK state fed back by the UE.

Mapping 4: each ACK state has a mapping relation with an indexed row in a CQI table. For example, ACK state 2 corresponds to a second row in the CQI table, and receiving ACK state 2 means that a current channel state is a channel state indicated by the second row in the CQI table.

In solution 5, there are multiple ACK states, and each state indicates that the decoding is correct. Each state has a certain mapping relation with CQI information. The CQI information may be the offset value or a row index in the CQI table. After decoding the one ACK state, the CQI feedback enhancement device may acquire the CQI information without decoding the CQI information separately. However, in solution 4, after the ACK instruction and the aperiodic CQI are received, only decoding success information is acquired by decoding the ACK instruction, while the CQI information is acquired by decoding the aperiodic CQI.

In some embodiments, in the case where the second information includes the ACK instruction and the aperiodic CQI information or the second information includes the one ACK state, after the receiving module 502 receives the second information, the method further includes that: the CQI feedback enhancement device determines, according to the CQI information indicated by the second information, a parameter for scheduling a subsequent transmission.

An example is given below to describe solutions 3, 4 and 5.

For example, a current CQI table is a 16-row table, which needs to be denoted by 4 bits, and different row indexes represent different channel state information.

In an instance corresponding to solution 3, when the UE decodes downlink traffic data and obtains a correct result, only an ACK instruction is fed back without carrying any CQI information.

In an instance corresponding to solution 4, when the UE decodes downlink traffic data and obtains an error result, the UE reports an aperiodic CQI to the receiving module 502 while feeding back an NACK instruction to the receiving module 502. That is, the UE needs to feed back aperiodic CQI reporting having 4-bit overheads simultaneously while the UE feeds back the NACK instruction.

In an instance where mapping 4 is used in solution 5, when the UE decodes downlink traffic data and obtains a correct result, the UE feeds back one ACK state to the receiving module 502. There are 8 ACK states denoted as ACK 0 to ACK 7. The multiple states have a mapping relation with CQI information. The mapping relation is as shown in Table 23 below. CQI 0 to CQI 7 are indexes of 8 rows among 16 rows of a CQI table. The last 8 rows are reserved and may represent different NACK states, which are denoted as "reserved".

TABLE 23

Instance of a Mapping Relation between Multilevel ACKs and CQIs

| ACK State Index | CQI Index |
| --- | --- |
| ACK 0 | CQI 0 |
| ACK 1 | CQI 1 |
| ACK 2 | CQI 2 |
| ACK 3 | CQI 3 |
| ACK 4 | CQI 4 |
| ACK 5 | CQI 5 |
| ACK 6 | CQI 6 |
| ACK 7 | CQI 7 |
| reserved | reserved |
| reserved | reserved |
| reserved | Reserved |
| reserved | reserved |
| reserved | reserved |
| reserved | reserved |
| reserved | reserved |
| reserved | reserved |

In an instance where mapping 3 is used in solution 5, when the UE decodes downlink traffic data and obtains a correct result, the UE feeds back one ACK state to the receiving module 502. There are 3 ACK states denoted as ACK 0 to ACK 2. Different states indicate different offset values for correcting existing CQI information. A relationship between ACK states and offset values is indicated by a 3-bit table, which is shown by Table 24 below. Reserved states may represent different NACK states, which are denoted as "reserved".

TABLE 24

Instance of a Relationship between Multilevel ACKs and CQI Correcting Offset Values

| ACK State Index | CQI Offset Value |
| --- | --- |
| ACK 0 | 0 |
| ACK 1 | 1 |
| ACK 2 | 3 |
| reserved | reserved |
| reserved | reserved |
| reserved | reserved |
| reserved | reserved |
| reserved | reserved |

When the UE decodes the downlink traffic data and obtains a correct result, it is possible that channel quality information indicated by the CQI reported to the receiving module 502 by the UE is lower than an actual CQI, so the CQI needs to be raised to improve the utilization rate of resources. Therefore, ACK states denoted as ACK 1 to ACK 2 in Table 24 correspond to positive offset values for correcting the CQI.

In some embodiments, the second sending module 501 sends downlink traffic data to the UE, and the UE determines to feed back an NACK or ACK according to a decoding result of the downlink traffic data. Feedback solutions for the same downlink traffic data may be free combinations of solution 1 or 2 for NACK and solution 3, 4 or 5 for ACK. That is, when the NACK is fed back for the downlink traffic data, any one of solutions 1 and 2 may be selected; and when the ACK is fed back for the downlink traffic data, any one of solutions 3, 4 and 5 may be selected. A final feedback solution is a combination of the NACK feedback solution and the ACK feedback solution.

A BLER of CQI information in first information and a BLER of CQI information in second information are described below.

In some embodiments, the BLER of the CQI information in the first information and the BLER of the CQI information in the second information are determined according to a BLER of an MCS table used by the second sending module 501 for sending downlink traffic data. That is, the BLER of the CQI information in the first information and the BLER of the CQI information in the second information are determined according to the following factor: a BLER of the MCS table used by the second sending module 501 for sending the downlink traffic data.

In some embodiments, the BLER of the CQI information in the first information adopts one BLER in the MCS table, and the BLER of the CQI information in the second information adopts one BLER in the MCS table. A rule for determining the BLER of the CQI information in the first information and the BLER of the CQI information in the second information according to a BLER of the MCS table used by the second sending module 501 for sending the downlink traffic data includes the following modes: selecting any one BLER from the MCS table, or selecting a BLER in a sequential manner or a reverse sequential manner according to an arrangement sequence in the MCS table.

In some embodiments, the CQI information in the first information uses a CQI table corresponding to the smallest BLER in BLERs of the MCS table, and the CQI information in the second information uses a CQI table corresponding to the largest BLER in the BLERs of the MCS table. That is, in NACK feedback, the strictest BLERn is selected as the BLER for CQI feedback, and in ACK feedback, the loosest BLER1 is selected as the BLER for CQI feedback, where BLER1>BLER2> . . . >BLERn, and n is a positive integer. In case of decoding errorly, it is indicated that the channel condition is poor, and it is necessary to feed back a CQI having a higher reliability for successful decoding. The smaller the BLER of a CQI, the higher the success rate of the decoding. Therefore, the smallest BLER is selected.

In some embodiments, determining the BLER of the CQI information in the first information and the BLER of the CQI information in the second information according to a BLER of the MCS table used by the second receiving module 502 for sending the downlink traffic data includes: the BLER of the CQI information in the first information being the same as a BLER of an MCS used by the downlink traffic data, and the BLER of the CQI in the second information being the same as a BLER of an MCS used by the downlink traffic data. That is, the BLER for feeding back the CQI is the same as a BLER of an MCS used by the downlink traffic data.

When the UE feeds back an ACK/NACK to the receiving module 502, CQI information in preceding solution 1 or 2 for NACK and CQI information in preceding solution 4 or 5 for ACK may be based on CQI tables of different BLERs. Similarly, MCS tables used by the second sending module 501 for transmitting downlink traffic data may be based on different BLERs. The BLER may have multiple values. Different BLERs are denoted as BLER1, BLER2, . . . and BLERn, where BLER1>BLER2> . . . >BLERn, and n is a positive integer. A BLER of a CQI table is determined according to the BLER of the MCS used by the base station for transmitting traffic data, and a specific solution is described below.

The UE feeds back an ACK/NACK to the receiving module 502, and CQI information related to the ACK/NACK feedback uses a CQI table of BLERi, where 1≤i≤n. That is, a BLER of CQI information in first information is one BLER in an MCS table, and a BLER of CQI information in second information is one BLER of the MCS table.

In some embodiments, the UE feeds back an ACK to the receiving module 502, and CQI information related to the ACK feedback uses a CQI table of BLER1. That is, the CQI information in the second information uses a CQI table corresponding to the largest BLER in BLERs of the MCS table.

In some embodiments, the UE feeds back an NACK to the receiving module 502, and CQI information related to the NACK feedback uses a CQI table corresponding to BLERn. That is, the CQI information in the first information uses a CQI table corresponding to the smallest BLER in the BLERs of the MCS table.

In some embodiments, the BLER of the MCS table used for transmitting downlink traffic data to the UE by the second sending module 501 is BLERj, the UE feeds back an ACK/NACK to the receiving module 502 after decoding the downlink traffic data, and CQI information related to the ACK/NACK feedback uses a CQI table of BLERj, where 1≤j≤n. That is, the BLER of the CQI information in the first information is the same as a BLER of an MCS used by the downlink traffic data, and a BLER of the CQI information in second information is the same as a BLER of an MCS used by the downlink traffic data.

An example is given below to describe the preceding solution.

For example, there are two BLER values for each of a CQI table and an MCS table, where $BLER1=10^{-1}$ and $BLER2=10^{-5}$.

No matter whether an MCS used by the second sending module 501 for sending downlink traffic data to the UE belongs to an MCS table having a BLER of $10^{-1}$ or an MCS table having a BLER of $10^{-5}$, the UE feeds back an ACK/NACK to the receiving module 502 after decoding the downlink traffic data, and CQI information related to the ACK/NACK uses a CQI table having a BLER of $10^{-1}$.

Alternatively, no matter whether the MCS used by the second sending module 501 for sending downlink traffic data to the UE belongs to an MCS table having a BLER of $10^{-1}$ or an MCS table having a BLER of $10^{-5}$, the UE feeds back an ACK/NACK to the receiving module 502 after decoding the downlink traffic data, and CQI information related to the ACK/NACK uses a CQI table having a BLER of $10^{-5}$.

In some embodiments, no matter whether the MCS used by the second sending module 501 for sending downlink traffic data to the UE belongs to an MCS table having a BLER of $10^{-1}$ or an MCS table having a BLER of $10^{-5}$, the UE decodes the downlink traffic data correctly and feeds back an ACK to the receiving module 502. CQI information related to the ACK uses a CQI table having a BLER of $10^{-1}$.

In some embodiments, no matter whether the MCS used by the second sending module 501 for sending downlink traffic data to the UE belongs to an MCS table having a BLER of $10^{-1}$ or an MCS table having a BLER of $10^{-5}$, the UE decodes the downlink traffic data in error and feeds back an NACK to the receiving module 502. CQI information related to the NACK uses a CQI table having a BLER of $10^{-5}$.

If the MCS used by the second sending module 501 for transmitting downlink traffic data to the UE belongs to an MCS table having a BLER of $10^{-1}$, the UE feeds back an ACK/NACK to the receiving module 502 after decoding the downlink traffic data, and CQI information related to the ACK/NACK uses a CQI table having a BLER of $10^{-1}$. Similarly, if the MCS used by the second sending module 501 for transmitting downlink traffic data to the UE belongs to an MCS table having a BLER of $10^{-5}$, the UE feeds back an ACK/NACK to the receiving module 502 after decoding the downlink traffic data, and CQI information related to the ACK/NACK uses a CQI table having a BLER of $10^{-5}$.

The second sending module 501 sends downlink traffic data to the UE, and the UE feeds back an NACK or ACK to the receiving module 502 according to a decoding result. Any one of solutions 1 and 2 may be selected for the NACK feedback. Any one of solutions 3, 4 and 5 may be selected for the ACK feedback. A final feedback solution of downlink traffic data decoding is formed by combining the NACK feedback solution and the ACK feedback solution. In the final feedback solution, the number of bits of NACK feedback may be greater than the number of bits of ACK feedback, and consequently, the CQI feedback enhancement device and the UE may be not uniform in the understanding of the number of feedback bits. This affects the determination of a position where the CQI feedback enhancement device detects feedback information. In view of the fact that ACK feedback information (that is, second information) and NACK feedback information (that is, first information) are not uniform in the number of bits, an embodiment of the present disclosure provides the three solutions described below.

Solution 6: in the case where decoding of downlink traffic data has a correct result and the number of bits of second information is less than the number of bits of first information, before the step of sending the second information to the receiving module 502, the method further includes: padding the second information so that the number of bits of the padded second information is equal to the number of bits of the first information.

In some embodiments, the step of padding the second information includes: performing zero-padding on the second information, or repeating a bit of the second information.

That is, when the number of bits of ACK feedback information is less than the number of bits of NACK feedback information, the ACK feedback information is padded, and the number of bits of the padded ACK information fed back to the receiving module 502 by the UE is the same as the number of bits of the NACK information fed back to the receiving module 502 by the UE. The padding may be performing zero-padding on the ACK feedback information, or repeating a bit of the ACK feedback information.

Solution 7: second information and first information each have n bits, m states of $2^n$ states have a mapping with CQIs, the number of ACK states in the $2^n$ states is denoted as x, the number of NACK states in the $2^n$ states is denoted as y, where $1 \leq m \leq 2^n$, $1 \leq x \leq 2^n$, $1 \leq y \leq 2^n$, $x+y=2^n$, and m, n, x and y are each a positive integer.

Solution 7 is applicable to at least the case where both an NACK and an ACK carry CQI information and the case where only an NACK carries CQI information and an ACK carries no CQI information.

Solution 8: the number of bits of second information is denoted as a, and the number of bits of first information is denoted as b, where a and b are each a positive integer; in the case where decoding of downlink traffic data has a correct result, a resource position for the second information is determined based on the number a of bits of the second information and a PUCCH resource indicated by the CQI feedback enhancement device; in the case where decoding of downlink traffic data has an error result, a resource position for the first information is determined based on the number b of bits of the first information and a PUCCH resource indicated by the CQI feedback enhancement device.

That is, solution 8 allows ACK feedback information and NACK feedback information to have different numbers of bits, where the number of bits of the ACK feedback information is a, and the number of bits of the NACK feedback information is b. When the UE feeds back an ACK, resource position #1 used by the feedback is determined based on the number a of information bits and the PUCCH resource indicated by the CQI feedback enhancement device. When the UE feeds back an NACK, resource position #2 used by the feedback is determined based on the number b of information bits and the PUCCH resource indicated by the CQI feedback enhancement device. Here, a may be equal to b, or different from b. When a=b, resource positions #1 and #2 represent the same resource. When a≠b, resource positions #1 and #2 represent different resources.

After the receiving module 502 receives the first information sent by the UE and/or the receiving module 502 receives the second information sent by the UE, the method further includes that: the CQI feedback enhancement device firstly detects the second information at the resource position for the second information, and then, in the case where no second information is detected at the resource position for the second information, the CQI feedback enhancement device detects the first information at the resource position for the first information. That is, this solution for receiving an ACK/NACK by the CQI feedback enhancement device has a smaller blind detection complexity. For example, in at least 90% detections, the second information can be detected at the resource position of the second information, and there is no need to detect the first information.

An example is given below to describe solutions 6, 7 and 8.

For example, when the UE feeds back an ACK/NACK and a CQI to the receiving module 502, only the NACK state carries CQI information, and there are 15 NACK states, where different states represent different CQI information, having 4-bit overheads; and the ACK carries no CQI information, and there is only one state, having 1-bit overheads, where the bit field is set to 1 and represents the ACK.

In an instance corresponding to solution 6, the number of bits of ACK feedback information is less than the number of bits of NACK feedback information. The ACK feedback is padded, and the number of bits of the padded ACK feedback is the same as the number of bits of the NACK feedback. If zero-padding is performed on the ACK feedback, state 1000 denotes that the decoding state is an ACK. If the bit of the ACK is repeated to pad the ACK feedback, state 1111 denotes that the decoding state is an ACK. In this case, the ACK uses 4 bits and occupies one state of 16 states, and an NACK occupies the remaining 15 states.

In an instance corresponding to solution 7, ACK/NACK feedback information has 4 bits. 15 states of 16 states have a mapping relation with CQIs. One state of the 16 states denotes that the feedback information is an ACK, and the remaining 15 states denote NACKs. An ACK/NACK feedback solution is represented by a 4-bit table. As shown in Table 25 below, 15 NACK states are denoted as NACK 0 to NACK 14, and each NACK state has a direct mapping relation with CQI information. CQI 0 to CQI 14 denote 15 row indexes in a 16-row CQI table. An ACK state, which does not carry CQI information, is represented as ACK 15, which is denoted as "reserved".

TABLE 25

Instance of a Mapping Relation between Multilevel NACKs and CQIs

| NACK State Index | CQI Index |
| --- | --- |
| NACK 0 | CQI 0 |
| NACK 1 | CQI 1 |
| NACK 2 | CQI 2 |
| NACK 3 | CQI 3 |
| NACK 4 | CQI 4 |
| NACK 5 | CQI 5 |
| NACK 6 | CQI 6 |
| NACK 7 | CQI 7 |
| NACK 8 | CQI 8 |
| NACK 9 | CQI 9 |
| NACK 10 | CQI 10 |
| NACK 11 | CQI 11 |
| NACK 12 | CQI 12 |
| NACK 13 | CQI 13 |
| NACK 14 | CQI 14 |
| ACK 15 | reserved |

In an instance corresponding to solution 8, ACK feedback has 1-bit overhead, and NACK feedback has 4-bit overheads. Resource position #1 used by the ACK feedback is determined based on the 1-bit overhead and a PUCCH resource indicated by the CQI feedback enhancement device. Resource position #2 used by the NACK feedback is determined based on the 4-bit overheads and a PUCCH resource indicated by the CQI feedback enhancement device.

According to the CQI feedback enhancement device provided by the embodiment of the present disclosure, in some implementation processes, the CQI reporting has not only smaller resource overheads but also low latency, implementing reliable CQI reporting and meeting strict requirements set in some scenarios for the reliability and low latency of data transmission.

Embodiment Six

Figure 6:
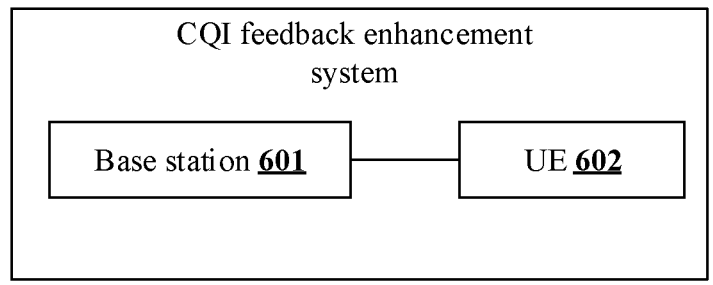
FIG. 6 is a schematic structural diagram of a CQI feedback enhancement system according to embodiment six of the present disclosure.

To solve the problem of large resource overheads and/or high latency in CQI reporting, a CQI feedback enhancement system is provided according to an embodiment of the present disclosure. Referring to FIG. 6, the CQI feedback enhancement system provided by the embodiment includes a base station 601 and a UE 602.

The base station 601 is configured to send downlink traffic data to the UE 602, and receive first information sent by the UE 602 in a case where an error result is obtained by decoding the downlink traffic data.

The UE 602 is configured to decode the downlink traffic data, and send first information to the base station 601 in a case where an error result is obtained by decoding the downlink traffic data. The first information includes an NACK instruction and aperiodic CQI information. Alternatively, the first information includes one NACK state of multiple NACK states, where different NACK states correspond to different CQI information.

After the base station 601 receives the first information, the base station 601 determines, according to the CQI information indicated by the first information, a parameter of a retransmission data packet, and sends the retransmission data packet to the UE 602 according to the determined parameter, so as to meet requirements for the reliability and latency of data transmission.

When the base station 601 sends the downlink traffic data to the UE 602, the base station 601 may determine an MCS for the downlink traffic data based on the CQI and other information reported by the UE 602. The base station 601 may perform modulation and coding on the downlink traffic data according to the selected MCS. After the UE 602 receives the downlink traffic data sent by the base station 601, the UE 602 may decode the downlink traffic data according to the MCS. If the UE 602 decodes the downlink traffic data and obtains an error result, the UE 602 sends an NACK to the base station 601. After receiving the NACK information, the base station 601 sends the retransmission data packet to the UE 602. One reason for obtaining the error result by decoding the downlink traffic data by the UE 602 is that: the CQI reporting information the base station 601 refers to when the base station 601 determines the MCS for the downlink traffic data cannot accurately reflect a CQI during downlink traffic data transmission. In view of this, there are solutions described below.

Solution 1: when the UE 602 decodes the downlink traffic data and obtains an error result, the UE 602 reports aperiodic CQI information to the base station 601 while sending an NACK instruction to the base station 601. After the base station 601 receives the NACK instruction and the CQI information, the base station 601 determines, according to the CQI information, an MCS and other parameters of a retransmission data packet, so as to meet requirements for the reliability and latency of data transmission.

In the related art, for aperiodic CQI reporting, the base station needs to send control information to trigger the UE to perform reporting. The process includes: the control information is sent to the UE, the UE receives the control information, and sends an aperiodic CQI to the base station after measurement. In this way, the reported CQI approximates to a CQI during traffic data transmission, but aperiodic CQI reporting has complicated process and high latency, so the CQI reporting may fail to reach a traffic latency target. However, in solution 1 provided by the embodiment of the present disclosure, after obtaining the error result by decoding the downlink traffic data by the UE 602, the NACK instruction and the aperiodic CQI are simultaneously reported to the base station 601, leading to simpler process and lower latency, and the reported CQI information may be directly used when the data packet is retransmitted.

Solution 2: when the UE 602 decodes the downlink traffic data and obtains an error result, the UE 602 sends one NACK state to the base station 601. There are multiple NACK states. Different NACK states have a mapping relation with CQI information. That is, different NACK states correspond to different CQI information. After the base station 601 receives the one NACK state, the base station 601 determines, according to CQI information corresponding to the one NACK state, an MCS and other parameters of a retransmission data packet, so as to meet requirements for the reliability and latency of data packet transmission.

In some embodiments, different NACK states corresponding to different CQI information in solution 2 includes: different NACK states corresponding to different first offset value information for correcting a CQI previously received by the base station 601, or different NACK states corresponding to different CQI reporting information. Here, the previously received CQI may be a proximate CQI previously received, or any CQI previously received; the same applies below.

In solution 2, the multiple NACK states may be referred to as multilevel NACKs. Each NACK state itself has a certain mapping relation with CQI information. Two mappings are exemplified below.

Mapping 1: each NACK state indicates a CQI offset value (that is, first offset value information for correcting the CQI previously received by the base station 601). The base station 601 corrects the previously received CQI based on an offset value corresponding to the one NACK state fed back by the UE 602.

Mapping 2: each NACK state has a mapping relation with an indexed row in a CQI table. For example, NACK state 2 corresponds to a second row in the CQI table, and receiving NACK state 2 means that a current channel state is a channel state indicated by the second row in the CQI table.

In solution 2, there are multiple NACK states, and each state indicates that an error is obtained by decoding. Each state has a certain mapping relation with CQI information. The CQI information may be the offset value or a row index in the CQI table. After the base station 601 decodes the one NACK state, the base station 601 may acquire the CQI information without decoding the CQI information separately. However, in solution 1, after the NACK instruction and the aperiodic CQI are received, only decoding error information is acquired by decoding the NACK instruction, while the CQI information is acquired by decoding the aperiodic CQI.

In solution 2, the first information (that is, the one NACK state of the multiple NACK states) sent by the UE 602 to the base station 601 may have 2 bits, 3 bits, 4 bits, 5 bits or the like, which is not limited in the embodiment. A description is given below using an example where the one NACK state has 4 bits. The one NACK state sent to the base station 601 by the UE 602 may be denoted in binary format. For example, 0000 denotes that the one NACK state is NACK0, and 0001 denotes that the one NACK state is NACK1. However, in solution 1, when the UE 602 decodes the downlink traffic data and obtains an error result, the NACK instruction sent to the base station 601 by the UE 602 only has one state. For ease of understanding, an example is given below to describe the case where the NACK instruction only has one state. For example, when the UE 602 decodes the downlink traffic data and obtains a correct result, the UE 602 sends an ACK denoted as 1 to the base station 601; and when the UE 602 decodes the downlink traffic data and obtains an error result, the UE 602 sends an NACK denoted as 0 to the base station 601. In this case, each of the ACK and the NACK has only one state.

An example is given below to describe solutions 1 and 2.

For example, a current CQI table is a 16-row table, which needs to be denoted by 4 bits, and different row indexes represent different channel state information.

In an instance corresponding to solution 1, when the UE 602 decodes downlink traffic data and obtains an error result, the UE 602 reports an aperiodic CQI to the base station 601 while feeding back an NACK instruction to the base station 601. That is, the UE 602 needs to feed back aperiodic CQI reporting having 4-bit overheads simultaneously when the UE 602 feeds back the NACK instruction.

In an instance where mapping 2 is used in solution 2, when the UE 602 decodes downlink traffic data and obtains an error result, the UE 602 feeds back one NACK state to the base station 601. There are 15 NACK states denoted as NACK0 to NACK14. The multiple states have a direct mapping relation with CQI information. The mapping relation is represented by a 4-bit table. As shown in Table 26 below, CQI 0 to CQI 14 are indexes of 15 rows among 16 rows of a CQI table, and the last row is reserved and may represent an ACK state which does not carry CQI information, which is denoted as "reserved".

TABLE 26

Instance of a Mapping Relation between Multilevel NACKs and CQIs

| NACK State Index | CQI Index |
| --- | --- |
| NACK 0 | CQI 0 |
| NACK 1 | CQI 1 |
| NACK 2 | CQI 2 |
| NACK 3 | CQI 3 |
| NACK 4 | CQI 4 |
| NACK 5 | CQI 5 |
| NACK 6 | CQI 6 |
| NACK 7 | CQI 7 |
| NACK 8 | CQI 8 |
| NACK 9 | CQI 9 |
| NACK 10 | CQI 10 |
| NACK 11 | CQI 11 |
| NACK 12 | CQI 12 |
| NACK 13 | CQI 13 |
| NACK 14 | CQI 14 |
| reserved | reserved |

In an instance where mapping 1 is used in solution 2, when the UE 602 decodes downlink traffic data and obtains an error result, the UE 602 feeds back an NACK state to the base station 601. There are 5 NACK states denoted as NACK 0 to NACK 4. Different states indicate different offset values for correcting CQI information previously received. A relationship between NACK states and offset values is represented by a 3-bit table, which is shown by Table 27 below. Reserved states may represent different ACK states, which are denoted as "reserved".

TABLE 27

Instance of a Relationship between Multilevel NACKs and CQI Correcting Offset Values

| NACK State Index | CQI Offset Value |
| --- | --- |
| NACK 0 | 0 |
| NACK 1 | −1 |
| NACK 2 | −3 |
| NACK 3 | −5 |
| NACK 4 | −7 |
| reserved | reserved |
| reserved | reserved |
| reserved | reserved |

When the UE 602 decodes the downlink traffic data and obtains an error result, it is possible that channel quality information indicated by the CQI reported to the base station 601 by the UE 601 is higher than an actual CQI, so the CQI needs to be lowered. Therefore, NACK states denoted as NACK 1 to NACK 4 in Table 27 correspond to negative offset values for correcting the CQI.

The case where the UE 602 decodes the downlink traffic data and obtains an error result is described above. A case where the UE 602 decodes downlink traffic data and obtains a correct result is described below.

When the UE 602 decodes the downlink traffic data and obtains a correct result, the UE 602 sends second information to the base station 601. The second information includes an ACK. Alternatively, the second information includes an ACK instruction and aperiodic CQI information. Alternatively, the second information includes one ACK state of multiple ACK states, where different ACK states correspond to different CQI information. The base station 601 receives the second information.

When the base station 601 sends the downlink traffic data to the UE 602, the base station 601 may determine an MCS for the downlink traffic data based on the CQI and other information reported by the UE 602. The base station 601 may perform modulation and coding on the downlink traffic data according to the selected MCS. After the UE 602 receives the downlink traffic data sent by the base station 601, the UE 602 may decode the downlink traffic data according to the MCS. When the UE 602 decodes the downlink traffic data and obtains a correct result, the UE 602 feeds back an ACK to the base station 601. After the base station 601 receives the ACK feedback, it is indicated that transmission of the downlink traffic data is completed. The CQI information may be carried simultaneously when the UE 602 feeds back the ACK instruction to the base station 601. The base station 601 may schedule a next traffic transmission with reference to the CQI information. In view of this, there are the solutions described below.

Solution 3: when the UE 602 decodes downlink traffic data correctly, only an ACK instruction is fed back without carrying CQI information.

In some embodiments, when the UE 602 feeds back an ACK/NACK to the base station 601, only the NACK state has a mapping relation with CQI information, while the ACK instruction merely indicates that the downlink traffic data is correctly decoded.

Solution 4: when the UE 602 decodes downlink traffic data correctly, the UE 602 reports aperiodic CQI information to the base station 601 simultaneously when feeding back an ACK instruction to the base station 601. When the base station 601 schedules a subsequent transmission, the base station 601 determines, according to the CQI information, an MCS and other parameters for scheduling data, so as to meet requirements for the reliability and latency of data transmission.

Solution 5: when the UE 602 decodes downlink traffic data correctly, the UE 602 feeds back one ACK state to the base station 601. There are multiple ACK states. Different states have a mapping relation with CQI information. After the base station 601 receives the one ACK state, the base station 601 determines, according to CQI information corresponding to the one ACK state, an MCS and other parameters for scheduling a subsequent transmission, so as to meet requirements for the reliability and latency of data transmission.

In some embodiments, different ACK states corresponding to different CQI information in solution 5 includes: different ACK states corresponding to different second offset value information for correcting a CQI previously received by the base station 601, or different ACK states corresponding to different CQI reporting information. CQI reporting information may be aperiodic CQI reporting information.

In solution 5, the multiple ACK states may be referred to as multilevel ACKs. Each ACK state itself has a certain mapping relation with CQI information. Two mappings are exemplified below.

Mapping 3: each ACK state indicates a CQI offset value (that is, second offset value information for correcting the CQI previously received by the base station 601). The base station 601 corrects the previously received CQI based on an offset value corresponding to the one NACK state fed back by the UE 602.

Mapping 4: each ACK state has a mapping relation with an indexed row in a CQI table. For example, ACK state 2 corresponds to a second row in the CQI table, and receiving ACK state 2 means that a current channel state is a channel state indicated by the second row in the CQI table.

In solution 5, there are multiple ACK states, and each state indicates that the decoding is correct. Each state has a certain mapping relation with CQI information. The CQI information may be the offset value or a row index in the CQI table. After decoding the one ACK state, the base station 601 may acquire the CQI information without decoding the CQI information separately. However, in solution 4, after the ACK instruction and the aperiodic CQI are received, only decoding success information is acquired by decoding the ACK instruction, while the CQI information is acquired by decoding the aperiodic CQI.

In some embodiments, in the case where the second information includes the ACK instruction and the aperiodic CQI information or the second information includes the one ACK state, after the base station 601 receives the second information, the method further includes that: the base station 601 determines, according to the CQI information indicated by the second information, a parameter for scheduling a subsequent transmission.

An example is given below to describe solutions 3, 4 and 5.

For example, a current CQI table is a 16-row table, which needs to be denoted by 4 bits, and different row indexes represent different channel state information.

In an instance corresponding to solution 3, when the UE 602 decodes downlink traffic data and obtains a correct result, only an ACK instruction is fed back without carrying any CQI information.

In an instance corresponding to solution 4, when the UE 602 decodes downlink traffic data and obtains a correct result, the UE 602 reports an aperiodic CQI to the base station 601 while feeding back an ACK instruction to the base station 601. That is, the UE 602 needs to feed back aperiodic CQI reporting having 4-bit overheads simultaneously while the UE 602 feeds back the ACK instruction.

In an instance where mapping 4 is used in solution 5, when the UE 602 decodes downlink traffic data and obtains a correct result, the UE 602 feeds back one ACK state to the base station 601. There are 8 ACK states denoted as ACK 0 to ACK 7. The multiple states have a mapping relation relation with CQI information. The mapping is as shown in Table 28 below. CQI 0 to CQI 7 are indexes of 8 rows among 16 rows of a CQI table. The last 8 rows are reserved and may represent different NACK states, which are denoted as "reserved".

TABLE 28

Instance of a Mapping Relation between Multilevel ACKs and CQIs

| ACK State Index | CQI Index |
|---|---|
| ACK 0 | CQI 0 |
| ACK 1 | CQI 1 |
| ACK 2 | CQI 2 |
| ACK 3 | CQI 3 |
| ACK 4 | CQI 4 |
| ACK 5 | CQI 5 |
| ACK 6 | CQI 6 |
| ACK 7 | CQI 7 |
| reserved | reserved |
| reserved | reserved |
| reserved | Reserved |
| reserved | reserved |
| reserved | reserved |
| reserved | reserved |
| reserved | reserved |
| reserved | reserved |

In an instance where mapping 3 is used in solution 5, when the UE 602 decodes downlink traffic data and obtains a correct result, the UE 602 feeds back an ACK state to the base station 601. There are 3 ACK states denoted as ACK 0 to ACK 2. Different states indicate different offset values for correcting existing CQI information. A relationship between ACK states and offset values is indicated by a 3-bit table, which is shown by Table 29 below. Reserved states may represent different NACK states, which are denoted as "reserved".

TABLE 29

Instance of a Relationship between Multilevel ACKs and CQI Correcting Offset Values

| ACK State Index | CQI Offset Value |
|---|---|
| ACK 0 | 0 |
| ACK 1 | 1 |
| ACK 2 | 3 |
| reserved | reserved |
| reserved | reserved |
| reserved | reserved |
| reserved | reserved |
| reserved | reserved |

When the UE 602 decodes the downlink traffic data and obtains a correct result, it is possible that channel quality information indicated by the CQI reported to the base station 601 by the UE 602 is lower than an actual CQI, so the CQI needs to be raised to improve the utilization rate of resources. Therefore, ACK states denoted as ACK 1 to ACK 2 in Table 29 correspond to positive offset values for correcting the CQI.

In some embodiments, the base station 601 sends downlink traffic data to the UE 602, and the UE 602 determines to feed back an NACK or ACK according to a decoding result of the downlink traffic data. Feedback solutions for the same downlink traffic data may be free combinations of solution 1 or 2 for NACK and solution 3, 4 or 5 for ACK. That is, when the NACK is fed back for the downlink traffic data, any one of solutions 1 and 2 may be selected; and when the ACK is fed back for the downlink traffic data, any one of solutions 3, 4 and 5 may be selected. A final feedback solution is a combination of the NACK feedback solution and the ACK feedback solution.

A BLER of CQI information in first information and a BLER of CQI information in second information are described below.

In some embodiments, the BLER of the CQI information in the first information and the BLER of the CQI information in the second information are determined according to a BLER of an MCS table used by the base station 601 for sending downlink traffic data. That is, the BLER of the CQI information in the first information and the BLER of the CQI information in the second information are determined according to the following factor: a BLER of the MCS table used by the base station 601 for sending the downlink traffic data.

In some embodiments, the BLER of the CQI information in the first information adopts one BLER in the MCS table, and the BLER of the CQI information in the second information adopts one BLER in the MCS table. A rule for determining the BLER of the CQI information in the first information and the BLER of the CQI information in the second information according to a BLER of the MCS table used by the base station 601 for sending the downlink traffic data includes the following modes: selecting any one BLER from the MCS table, or selecting a BLER in a sequential manner or a reverse sequential manner according to an arrangement sequence in the MCS table.

In some embodiments, the CQI information in the first information uses a CQI table corresponding to the smallest BLER in BLERs of the MCS table, and the CQI information in the second information uses a CQI table corresponding to the largest BLER in the BLERs of the MCS table. That is, in NACK feedback, the strictest BLERn is selected as the BLER for CQI feedback, and in ACK feedback, the loosest BLER1 is selected as the BLER for CQI feedback, where BLER1>BLER2> . . . >BLERn, and n is a positive integer. In case of decoding errorly, it is indicated that the channel condition is poor, and it is necessary to feed back a CQI having a higher reliability for successful decoding. The smaller the BLER of a CQI, the higher the success rate of decoding. Therefore, the smallest BLER is selected.

In some embodiments, determining the BLER of the CQI information in the first information and the BLER of the CQI information in the second information according to a BLER of the MCS table used by the base station 601 for sending the downlink traffic data includes: the BLER of the CQI information in the first information being the same as a BLER of an MCS used by the downlink traffic data, and the BLER of the CQI in the second information being the same as a BLER of an MCS used by the downlink traffic data. That is, the BLER for feeding back the CQI is the same as a BLER of an MCS used by the downlink traffic data.

When the UE 602 feeds back an ACK/NACK to the base station 601, CQI information in preceding solution 1 or 2 for NACK and CQI information in preceding solution 4 or 5 for ACK may be based on CQI tables of different BLERs. Similarly, MCS tables used by the base station 601 for transmitting downlink traffic data may be based on different BLERs. The BLER may have multiple values. Different BLERs are denoted as BLER1, BLER2, . . . and BLERn, where BLER1>BLER2> . . . >BLERn, and n is a positive integer. A BLER of a CQI table is determined according to the BLER of the MCS used by the base station for transmitting traffic data, and a specific solution is described below.

The UE 602 feeds back an ACK/NACK to the base station 601, and CQI information related to the ACK/NACK feedback uses a CQI table of BLERi, where 1≤i≤n. That is, a BLER of CQI information in first information is one BLER in an MCS table, and a BLER of CQI information in second information is one BLER of the MCS table.

In some embodiments, the UE 602 feeds back an ACK to the base station 601, and CQI information related to the ACK feedback uses a CQI table of BLER1. That is, the CQI information in the second information uses a CQI table corresponding to the largest BLER in BLERs of the MCS table.

In some embodiments, the UE 602 feeds back an NACK to the base station 601, and CQI information related to the NACK feedback uses a CQI table of BLERn. That is, the CQI information in the first information uses a CQI table corresponding to the smallest BLER in the BLERs of the MCS table.

In some embodiments, the BLER of the MCS table used for transmitting downlink traffic data to the UE 602 by the base station 601 is BLERj, the UE 602 feeds back an ACK/NACK to the base station 601 after decoding the downlink traffic data, and CQI information related to the ACK/NACK feedback uses a CQI table of BLERj, where 1≤j≤n. That is, the BLER of the CQI information in the first information is the same as a BLER of an MCS used by the downlink traffic data, and the BLER of the CQI information in the second information is the same as a BLER of an MCS used by the downlink traffic data.

An example is given below to describe the preceding solution.

For example, there are two BLER values for each of a CQI table and an MCS table, where BLER1=$10^{-1}$ and BLER2=$10^{-5}$.

No matter whether an MCS used by the base station 601 for sending downlink traffic data to the UE 602 belongs to an MCS table having a BLER of $10^{-1}$ or an MCS table having a BLER of $10^{-5}$, the UE 602 feeds back an ACK/NACK to the base station 601 after decoding the downlink traffic data, and CQI information related to the ACK/NACK uses a CQI table having a BLER of $10^{-1}$.

Alternatively, no matter whether the MCS used by the base station 601 for sending downlink traffic data to the UE 602 belongs to an MCS table having a BLER of $10^{-1}$ or an MCS table having a BLER of $10^{-5}$, the UE 602 feeds back an ACK/NACK to the base station 601 after decoding the downlink traffic data, and CQI information related to the ACK/NACK uses a CQI table having a BLER of $10^{-5}$.

In some embodiments, no matter whether the MCS used by the base station 601 for sending downlink traffic data to the UE 602 belongs to an MCS table having a BLER of $10^{-1}$ or an MCS table having a BLER of $10^{-5}$, the UE 602 decodes the downlink traffic data correctly and feeds back an ACK to the base station 601, and CQI information related to the ACK uses a CQI table having a BLER of $10^{-1}$.

In some embodiments, no matter whether the MCS used by the base station 601 for sending downlink traffic data to the UE 602 belongs to an MCS table having a BLER of $10^{-1}$ or an MCS table having a BLER of $10^{-5}$, the UE 602 decodes the downlink traffic data in error and feeds back an NACK to the base station 601, and CQI information related to the NACK feedback uses a CQI table having a BLER of $10^{-5}$.

If the MCS used by the base station 601 for transmitting downlink traffic data to the UE 602 belongs to an MCS table having a BLER of $10^{-1}$, the UE 602 feeds back an ACK/NACK to the base station 601 after decoding the downlink traffic data, and CQI information related to the ACK/NACK uses a CQI table having a BLER of $10^{-1}$. Similarly, if the MCS used by the base station 601 for transmitting downlink traffic data to the UE 602 belongs to an MCS table having a BLER of $10^{-5}$, the UE 602 feeds back an ACK/NACK to the base station 601 after decoding the downlink traffic data, and CQI information related to the ACK/NACK uses a CQI table having a BLER of $10^{-5}$.

The base station 601 sends downlink traffic data to the UE 602, and the UE 602 feeds back an NACK or ACK to the base station 601 according to a decoding result. Any one of solutions 1 and 2 may be selected for the NACK feedback. Any one of solutions 3, 4 and 5 may be selected for the ACK feedback. A final feedback solution of downlink traffic data decoding are formed by combining the NACK feedback solution and the ACK feedback solution. In the final feedback solution, the number of bits of NACK feedback may be greater than the number of bits of ACK feedback, and consequently, the UE 602 and the base station 601 may be not uniform in the understanding of the number of feedback bits. This affects the determination of a position where the base station 601 detects feedback information. In view of the fact that ACK feedback information (that is, second information) and NACK feedback information (that is, first information) are not uniform in the number of bits, an embodiment of the present disclosure provides the three solutions described below.

Solution 6: in the case where decoding of downlink traffic data has a correct result and the number of bits of second information is less than the number of bits of first information, before the step of sending the second information to the base station 601, the method further includes: padding the second information so that the number of bits of the padded second information is equal to the number of bits of the first information.

In some embodiments, the step of padding the second information includes: performing zero-padding on the second information, or repeating a bit of the second information.

That is, when the number of bits of ACK feedback information is less than the number of bits of NACK feedback information, the ACK feedback information is padded, and the number of bits of the padded ACK information fed back to the base station 601 by the UE 602 is the same as the number of bits of the NACK information fed back to the base station 601 by the UE 602. The padding may be performing zero-padding on the ACK feedback information, or repeating a bit of the ACK feedback information.

Solution 7: second information and first information each have n bits, m states of $2^n$ states have a mapping relation with CQIs, the number of ACK states in the $2^n$ states is denoted as x, the number of NACK states in the $2^n$ states is denoted as y, where $1 \leq m \leq 2^n$, $1 \leq x \leq 2^n$, $1 \leq y \leq 2^n$, $x+y=2^n$, and m, n, x and y are each a positive integer.

Solution 7 is applicable to at least the case where both an NACK and an ACK carry CQI information and the case where only an NACK carries CQI information and an ACK carries no CQI information.

Solution 8: the number of bits of second information is denoted as a, and the number of bits of first information is denoted as b, where a and b are each a positive integer; in the case where decoding of downlink traffic data has a correct result, a resource position for the second information is determined based on the number a of bits of the second information and a physical uplink control channel (PUCCH) resource indicated by the base station 601; in the case where decoding of downlink traffic data has an error result, a resource position for the first information is determined based on the number b of bits of the first information and a PUCCH resource indicated by the base station 601.

That is, solution 8 allows ACK feedback information and NACK feedback information to have different numbers of bits, where the number of bits of the ACK feedback information is a, and the number of bits of the NACK feedback information is b. When the UE 602 feeds back an ACK, resource position #1 used by the feedback is determined based on the number a of information bits and the PUCCH resource indicated by the base station 601. When the UE 602 feeds back an NACK, resource position #2 used by the feedback is determined based on the number b of information bits and the PUCCH resource indicated by the base station 601. Here, a may be equal to b, or different from b. When a=b, resource positions #1 and #2 represent the same resource. When a≠b, resource positions #1 and #2 represent different resources.

After the base station 601 receives the first information sent by the UE 602 and/or the base station 601 receiving the second information sent by the UE 602, the method further includes that: the base station 601 firstly detects the second information at the resource position for the second information, and then, in the case where no second information is detected at the resource position for the second information, the base station 602 detects the first information at the resource position for the first information. That is, this solution for receiving an ACK/NACK by the base station 601 has a smaller blind detection complexity. For example, in at least 90% detections, the second information can be detected at the resource position of the second information, and there is no need to detect the first information.

An example is given below to describe solutions 6, 7 and 8.

For example, when the UE 602 feeds back an ACK/NACK and a CQI to the base station 601, only the NACK state carries CQI information, and there are 15 NACK states, where different states represent different CQI information, having 4-bit overheads; and the ACK carries no CQI information, and there is only one state, having 1-bit overheads, where the bit field is set to 1 and represents the ACK.

In an instance corresponding to solution 6, the number of bits of ACK feedback information is less than the number of bits of NACK feedback information. The ACK feedback is padded, and the number of bits of the padded ACK feedback is the same as the number of bits of the NACK feedback. If zero-padding is performed on the ACK feedback, state 1000 denotes that the decoding state is an ACK. If the bit of the ACK is repeated to pad the ACK feedback, state 1111 denotes that the decoding state is an ACK. In this case, the ACK uses 4 bits and occupies one state of 16 states, and an NACK occupies the remaining 15 states.

In an instance corresponding to solution 7, ACK/NACK feedback information has 4 bits. 15 states of 16 states have a mapping relation with CQIs. One state of the 16 states denotes that the feedback information is an ACK, and the remaining 15 states denote NACKs. An ACK/NACK feedback solution is represented by a 4-bit table. As shown in Table 30 below, 15 NACK states are denoted as NACK 0 to NACK 14, and each NACK state has a direct mapping relation with CQI information. CQI 0 to CQI 14 denote 15 row indexes in a 16-row CQI table. An ACK state which does not carry CQI information is represented as ACK 15, which is denoted as "reserved".

TABLE 30

Instance of a Mapping Relation between Multilevel NACKs and CQIs

| NACK State Index | CQI Index |
| --- | --- |
| NACK 0 | CQI 0 |
| NACK 1 | CQI 1 |
| NACK 2 | CQI 2 |
| NACK 3 | CQI 3 |
| NACK 4 | CQI 4 |
| NACK 5 | CQI 5 |
| NACK 6 | CQI 6 |
| NACK 7 | CQI 7 |
| NACK 8 | CQI 8 |
| NACK 9 | CQI 9 |
| NACK 10 | CQI 10 |
| NACK 11 | CQI 11 |
| NACK 12 | CQI 12 |
| NACK 13 | CQI 13 |
| NACK 14 | CQI 14 |
| ACK 15 | reserved |

In an instance corresponding to solution 8, ACK feedback has 1-bit overhead, and NACK feedback has 4-bit overheads. Resource position #1 used by the ACK feedback is determined based on the 1-bit overhead and a PUCCH resource indicated by the base station 601. Resource position #2 used by the NACK feedback is determined based on the 4-bit overheads and a PUCCH resource indicated by the base station 601.

According to the CQI feedback enhancement system provided by the embodiment of the present disclosure, in some implementation processes, the CQI reporting has not only smaller resource overheads but also low latency, implementing reliable CQI reporting and meeting strict requirements set in some scenarios for the reliability and low latency of data transmission.

Embodiment Seven

Figure 7:
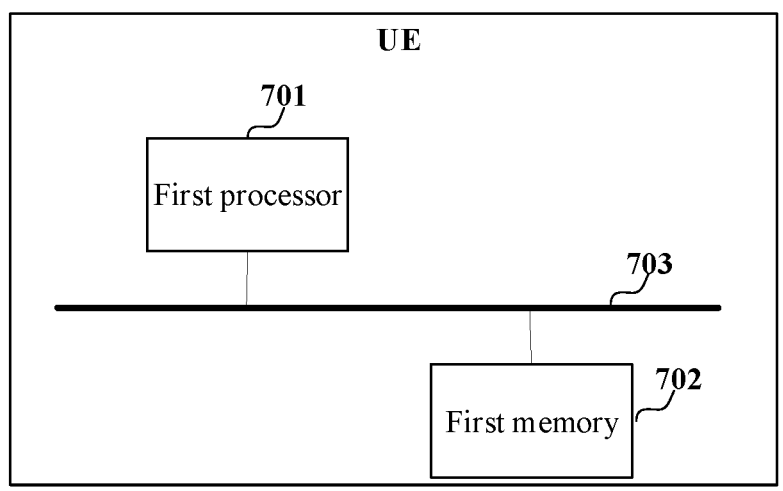
FIG. 7 is a schematic structural diagram of a UE according to embodiment seven of the present disclosure.

An embodiment of the present disclosure further provides a UE. Referring to FIG. 7, the UE includes a first processor 701, a first memory 702 and a first communication bus 703. The first communication bus 703 is configured to implement connection and communication between the first processor 701 and the first memory 702. The first processor 701 is configured to execute one or more computer programs stored in the first memory 702, so as to implement at least one step of the CQI feedback enhancement method of the above embodiment one.

Figure 8:
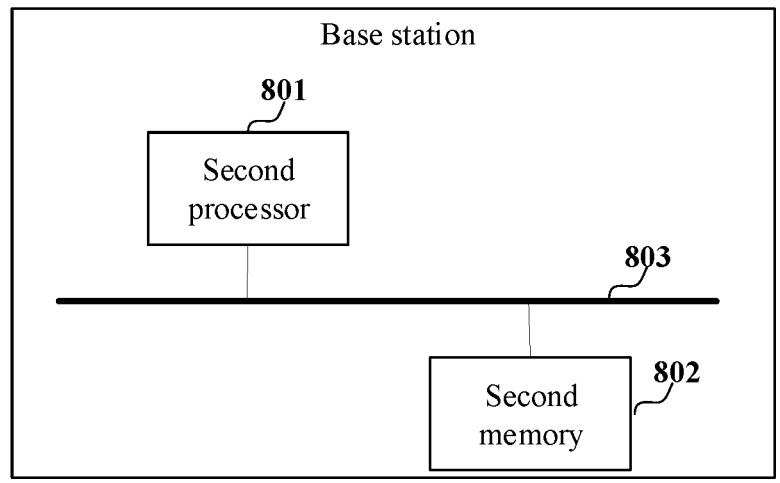
FIG. 8 is a schematic structural diagram of a base station according to embodiment seven of the present disclosure.

An embodiment of the present disclosure further provides a base station. Referring to FIG. 8, the base station includes a second processor 801, a second memory 802 and a second communication bus 803. The second communication bus 803 is configured to implement connection and communication between the second processor 801 and the second memory 802. The second processor 801 is configured to execute one or more computer programs stored in the second memory 802, so as to implement at least one step of the CQI feedback enhancement method of the above embodiment two.

Figure 9:
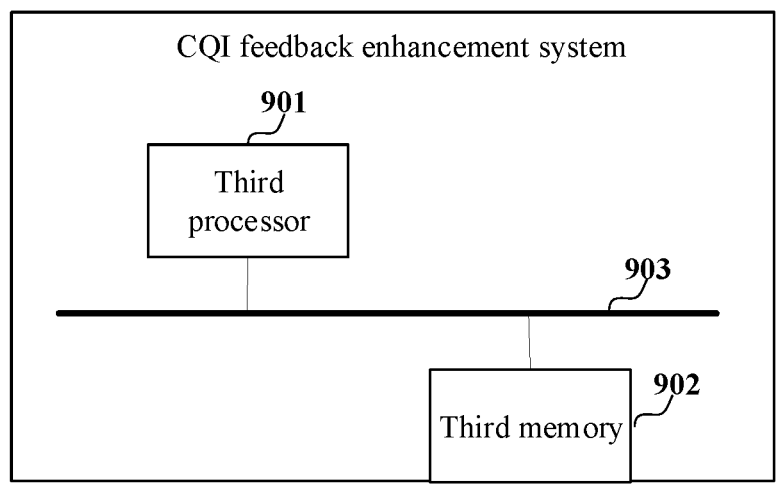
FIG. 9 is a schematic structural diagram of a CQI feedback enhancement system according to embodiment seven of the present disclosure.

An embodiment of the present disclosure further provides a CQI feedback enhancement system. Referring to FIG. 9, the CQI feedback enhancement system includes a third processor 901, a third memory 902 and a third communication bus 903. The third communication bus 903 is configured to implement connection and communication between the third processor 901 and the third memory 902. The third processor 901 is configured to execute one or more computer programs stored in the third memory 902, so as to implement at least one step of the CQI feedback enhancement method of the above embodiment three.

An embodiment of the present disclosure further provides a computer readable storage medium. The computer readable storage medium includes volatile or nonvolatile, removable or non-removable media implemented in multiple methods or technologies for storing information (such as computer readable instructions, data structures, computer program modules or other data). The computer readable storage medium includes, but is not limited to, a random-access memory (RAM), a read-only memory (ROM), an electrically erasable programmable read-only memory (EEPROM), a flash memory, or other memory technologies, a compact disc read-only memory (CD-ROM), a digital video disk (DVD) or another optical disc storage, a magnetic cassette, a magnetic tape, disk storage or another magnetic storage device, or any other medium that may be used for storing desired information and accessed by a computer.

The computer readable storage medium in the embodiment may be configured to store one or more computer programs executable by a processor to implement at least one step of the CQI feedback enhancement methods in embodiment one and/or embodiment two and/or embodiment three above.

An embodiment further provides a computer program. The computer program may be distributed on a computer readable medium and executed by a computing device to implement at least one step of the CQI feedback enhancement methods in embodiment one and/or embodiment two and/or embodiment three above. Moreover, in some circumstances, the at least one illustrated or described step may be executed in sequences different from those described in the embodiments above.

An embodiment further provides a computer program product. The computer program product includes a computer readable device on which the computer program above is stored. The computer readable device in this embodiment may include the computer readable storage medium above.

It can be seen that those skilled in the art should understand that all or part of the steps of the method, and functional modules/units in the system and the device disclosed above may be implemented as software (which may be implemented by computer program codes executable by a computing device), firmware, hardware, and appropriate combinations thereof. In the hardware implementation, the division of the functional modules/units mentioned in the above description may not correspond to a division of physical components. For example, one physical component may have several functions, or one function or step may be performed jointly by several physical components. Some or all physical components may be implemented as software executed by a processor such as a central processing unit, a digital signal processor or a microcontroller, may be implemented as hardware, or may be implemented as an integrated circuit such as an application-specific integrated circuit.

Additionally, as is known to those of ordinary skill in the art, a communication medium generally includes computer readable instructions, a data structure, a computer program module, or other data in a modulated data signal such as a carrier or other transmission mechanisms, and may include multiple information delivery media. Therefore, the present disclosure is not limited to any particular combination of hardware and software.

What is claimed is:

1. A channel quality indicator (CQI) feedback enhancement method, comprising:
 decoding downlink traffic data upon receiving the downlink traffic data sent by a base station; and
 sending first information to the base station in a case where an error result is obtained by decoding the downlink traffic data, wherein the first information comprises a negative acknowledgement (NACK) instruction and an aperiodic CQI, or the first information comprises one NACK state of a plurality of NACK states and different NACK states correspond to different CQIs;
 wherein a number of bits of the first information is denoted as b, wherein b is a positive integer; in the case where an error result is obtained by decoding the downlink traffic data, a resource position for the first information is determined based on the number b of bits of the first information and a physical uplink control channel (PUCCH) resource indicated by the base station.

2. The CQI feedback enhancement method of claim 1, wherein different NACK states corresponding to different CQIs comprises: different NACK states corresponding to different first offset value information for correcting a CQI previously received by the base station, or different NACK states corresponding to different CQI reporting information.

3. The CQI feedback enhancement method of claim 1, wherein a block-error rate (BLER) of the CQI in the first information is determined according to a BLER of a modulation coding scheme (MCS) table used by the base station for sending the downlink traffic data.

4. The CQI feedback enhancement method of claim 3, wherein the BLER of the CQI in the first information is one BLER in the MCS table.

5. The CQI feedback enhancement method of claim 4, wherein the CQI in the first information uses a CQI table corresponding to a smallest BLER in BLERs of the MCS table.

6. The CQI feedback enhancement method of claim 4, wherein determining the BLER of the CQI in the first information according to a BLER of the MCS table used by the base station for sending downlink traffic data comprises: the BLER of the CQI in the first information being the same as a BLER of an MCS used by the downlink traffic data.

7. A user equipment (UE), comprising a processor, a memory and a communication bus, wherein
 the communication bus is configured to implement connection and communication between the processor and the memory; and
 the processor is configured to execute one or more programs stored in the memory, so as to implement the CQI feedback enhancement method of claim 1.

8. A computer readable storage medium, storing one or more programs, wherein the one or more programs are executable by one or more processors to implement the CQI feedback enhancement method of claim 1.

9. A channel quality indicator (CQI) feedback enhancement method, comprising:
 sending downlink traffic data to a user equipment (UE); and
 receiving, in a case where an error result is obtained by decoding the downlink traffic data, first information sent by the UE, wherein the first information comprises a negative acknowledgement (NACK) instruction and an aperiodic CQI, or the first information comprises one NACK state of a plurality of NACK states and different NACK states correspond to different CQIs;
 wherein a number of bits of the first information is denoted as b, wherein b is a positive integer; in the case where an error result is obtained by decoding the downlink traffic data, a resource position for the first information is determined based on the number b of bits of the first information and an indicated physical uplink control channel (PUCCH) resource.

10. The CQI feedback enhancement method of claim 9, wherein different NACK states corresponding to different CQIs comprises: different NACK states corresponding to different first offset value information for correcting a CQI previously received, or different NACK states corresponding to different aperiodic CQI reporting information.

11. The CQI feedback enhancement method of claim 9, wherein after receiving the first information sent by the UE, the CQI feedback enhancement method further comprises: determining, according to the CQI indicated by the first information, a parameter of a retransmission data packet; and sending the retransmission data packet to the UE according to the determined parameter.

12. The CQI feedback enhancement method of claim 9, wherein a block-error rate (BLER) of the CQI in the first information is determined according to a BLER of a modulation coding scheme (MCS) table used for sending the downlink traffic data.

13. The CQI feedback enhancement method of claim 12, wherein the BLER of the CQI in the first information is one BLER in the MCS table.

14. The CQI feedback enhancement method of claim 13, wherein the CQI in the first information uses a CQI table corresponding to a smallest BLER in BLERs of the MCS table.

15. The CQI feedback enhancement method of claim 13, wherein determining the BLER of the CQI in the first information according to a BLER of the MCS table used for sending the downlink traffic data comprises: the BLER of the CQI in the first information being the same as a BLER of an MCS used by the downlink traffic data.

16. A base station, comprising a processor, a memory and a communication bus, wherein
 wherein the communication bus is configured to implement connection and communication between the processor and the memory; and
 the processor is configured to execute one or more programs stored in the memory, so as to implement the CQI feedback enhancement method of claim 9.

17. A computer readable storage medium, storing one or more programs, wherein the one or more programs are executable by one or more processors to implement the CQI feedback enhancement method of claim 9.

18. A channel quality indicator (CQI) feedback enhancement system, comprising a base station and a user equipment (UE), wherein
- the base station is configured to send downlink traffic data to the UE, and receive, in a case where an error result is obtained by decoding the downlink traffic data by the UE, first information sent by the UE; and
- the UE is configured to decode the downlink traffic data, and send the first information to the base station in the case where an error result is obtained by decoding the downlink traffic data, wherein the first information comprises a negative acknowledgement (NACK) instruction and an aperiodic CQI, or the first information comprises one NACK state of a plurality of NACK states and different NACK states correspond to different CQIs;
- wherein a number of bits of the first information is denoted as b, wherein b is a positive integer; in the case where an error result is obtained by decoding the downlink traffic data, a resource position for the first information is determined based on the number b of bits of the first information and a physical uplink control channel (PUCCH) resource indicated by the base station.

* * * * *